US012092136B2

(12) United States Patent
Judge et al.

(10) Patent No.: US 12,092,136 B2
(45) Date of Patent: Sep. 17, 2024

(54) FLUID EXCHANGE DEVICES AND RELATED CONTROLS, SYSTEMS, AND METHODS

(71) Applicant: Flowserve Pte Ltd., Singapore (SG)

(72) Inventors: Scott Judge, Bethlehem, PA (US); Neil Havrilla, Coplay, PA (US); Nathan Terwilliger, Bethlehem, PA (US); Christopher Shages, Bethlehem, PA (US); A. K. Necioglu, Macungie, PA (US); William J. Boyko, Bethlehem, PA (US); Josef Griesmer, Bethlehem, PA (US)

(73) Assignee: FLOWSERVE PTE. LTD., Singapore (SG)

( * ) Notice: Subject to any disclaimer, the term of this patent is extended or adjusted under 35 U.S.C. 154(b) by 0 days.

(21) Appl. No.: 18/108,644

(22) Filed: Feb. 12, 2023

(65) Prior Publication Data

US 2023/0258202 A1 Aug. 17, 2023

Related U.S. Application Data

(63) Continuation of application No. 17/588,197, filed on Jan. 28, 2022, which is a continuation of application No. 16/950,904, filed on Nov. 18, 2020, now Pat. No. 11,274,681, and a continuation-in-part of application No. 16/678,998, filed on Nov. 8, 2019, now Pat. No. 11,592,036.

(Continued)

(51) Int. Cl.

| | |
|---|---|
| *F15B 3/00* | (2006.01) |
| *F15B 11/02* | (2006.01) |
| *F15B 11/046* | (2006.01) |
| *F15B 15/28* | (2006.01) |

(52) U.S. Cl.

CPC ................ *F15B 3/00* (2013.01); *F15B 11/02* (2013.01); *F15B 11/046* (2013.01); *F15B 15/2861* (2013.01)

(58) Field of Classification Search

CPC .......... F04F 13/00; F15B 3/00; F15B 15/2861
See application file for complete search history.

(56) References Cited

U.S. PATENT DOCUMENTS

| | | | |
|---|---|---|---|
| 1,577,242 | A | 3/1926 | Andersen |
| 1,647,189 | A | 11/1927 | Philip et al. |

(Continued)

FOREIGN PATENT DOCUMENTS

| | | | |
|---|---|---|---|
| CN | 101705930 | B | 2/2012 |
| CN | 102421513 | A | 4/2012 |

(Continued)

OTHER PUBLICATIONS

PCT International Patent Application No. PCT/US2020/060929, International Search Report and Written Opinion Mailed Mar. 17, 2021, 11 pp.

(Continued)

*Primary Examiner* — Kenneth Bomberg
*Assistant Examiner* — Matthew Wiblin
(74) *Attorney, Agent, or Firm* — BKRIP LLC

(57) ABSTRACT

Devices, systems, and methods for detecting properties of motion of at least one component of fluid exchange devices, such as, for example, a pressure exchange device or system.

19 Claims, 19 Drawing Sheets

Related U.S. Application Data

(60) Provisional application No. 62/947,403, filed on Dec. 12, 2019, provisional application No. 62/758,366, filed on Nov. 9, 2018.

(56) References Cited

U.S. PATENT DOCUMENTS 1,647,734 A 11/1927 Kelly
1,769,672 A 7/1930 Blair
1,970,591 A 8/1934 Barks et al.
2,365,046 A 12/1944 Bottomley
2,600,836 A 6/1952 Boyd
2,615,465 A 10/1952 Woodward
3,089,504 A 5/1963 Crawford
3,223,173 A 12/1965 Paul, Jr.
3,347,554 A 10/1967 Jagger et al.
3,570,510 A 3/1971 Tsutsumi
3,583,606 A 6/1971 Ewald
3,595,265 A 7/1971 Cryder et al.
3,612,361 A 10/1971 Ewald et al.
3,661,167 A 5/1972 Hussey
3,661,400 A 5/1972 Weinand
3,675,825 A 7/1972 Morane
3,675,935 A 7/1972 Ludwig et al.
3,741,243 A 6/1973 Deibler et al.
3,749,291 A 7/1973 Prussin et al.
3,756,273 A 9/1973 Hengesbach
3,773,438 A 11/1973 Hall
3,776,278 A 12/1973 Allen
4,024,891 A 5/1977 Engel et al.
4,123,332 A 10/1978 Rotter
4,133,346 A 1/1979 Smith et al.
4,134,454 A 1/1979 Taylor
4,176,063 A 11/1979 Tyler
4,234,010 A 11/1980 Jenkins et al.
4,236,547 A 12/1980 Harasewych
4,244,555 A 1/1981 Maggioni et al.
4,249,868 A 2/1981 Kotyk
4,308,103 A 12/1981 Rotter
4,321,021 A 3/1982 Pauliukonis
4,350,176 A 9/1982 Lace
4,412,632 A 11/1983 Berger et al.
4,424,917 A 1/1984 Berger et al.
4,470,771 A * 9/1984 Hall .................... F04B 11/0075 417/342
4,479,356 A 10/1984 Gill
4,510,963 A 4/1985 Presley et al.
4,518,006 A 5/1985 Hoffmann et al.
4,536,131 A * 8/1985 Saito ...................... B65G 53/30 417/103
4,566,485 A 1/1986 Ruhle
4,570,853 A 2/1986 Schmied
4,579,511 A 4/1986 Burns
4,586,692 A 5/1986 Stephens
4,627,461 A 12/1986 Gordon
4,628,499 A * 12/1986 Hammett ............ F15B 15/2861 700/282
4,726,530 A 2/1988 Miller et al.
4,768,542 A 9/1988 Morris
4,834,193 A 5/1989 Leitko et al.
4,999,872 A 3/1991 Jentsch
5,033,557 A 7/1991 Askew
5,070,817 A 12/1991 Momont
5,172,918 A 12/1992 Pecht et al.
5,232,013 A 8/1993 Morris
5,234,031 A 8/1993 Pickett et al.
5,240,036 A 8/1993 Morris
5,299,859 A 4/1994 Tackett et al.
5,300,041 A 4/1994 Haber et al.
5,357,995 A 10/1994 King et al.
5,431,086 A 7/1995 Morita
5,797,429 A 8/1998 Shumway
5,951,169 A 9/1999 Oklejas et al.
5,992,289 A 11/1999 George et al.
6,036,435 A 3/2000 Oklejas
6,126,418 A 10/2000 Sinnl
6,293,245 B1 9/2001 Bock
6,441,605 B1 8/2002 Baurand
RE37,921 E 12/2002 Martin et al.
6,516,897 B2 2/2003 Thompson
6,540,487 B2 4/2003 Polizos et al.
6,607,368 B1 8/2003 Ross et al.
6,647,938 B2 11/2003 Gaessler et al.
6,659,731 B1 12/2003 Hauge
7,021,191 B2 4/2006 Moler
7,118,349 B2 10/2006 Oglesby
7,128,084 B2 10/2006 Long et al.
7,201,557 B2 4/2007 Stover
7,306,437 B2 12/2007 Hauge
7,474,013 B2 1/2009 Greenspan et al.
7,670,482 B2 3/2010 Wietham
7,871,522 B2 1/2011 Stover et al.
RE42,432 E 6/2011 Stover
7,997,853 B2 8/2011 Pique et al.
8,075,281 B2 12/2011 Martin et al.
8,297,303 B2 10/2012 Desantis et al.
8,360,250 B2 1/2013 Nguyen et al.
8,465,000 B2 6/2013 Bartell et al.
8,508,168 B2 8/2013 Duits
8,579,603 B2 11/2013 Oklejas et al.
8,603,218 B2 12/2013 Montie et al.
8,622,714 B2 1/2014 Andrews
9,108,162 B2 8/2015 Takahashi et al.
9,163,737 B2 10/2015 Andersson
9,328,743 B2 5/2016 Hirosawa et al.
9,435,354 B2 9/2016 Lehner et al.
9,440,895 B2 9/2016 Arluck et al.
9,500,394 B2 11/2016 Aniello
9,523,261 B2 12/2016 Flores et al.
9,546,671 B2 1/2017 Hirosawa et al.
9,556,736 B2 1/2017 Sigurdsson
9,587,752 B2 3/2017 Montague
9,604,889 B2 3/2017 Arluck et al.
9,611,948 B1 4/2017 Andersson
9,683,574 B2 6/2017 Winkler et al.
9,695,795 B2 7/2017 Martin et al.
9,719,521 B2 8/2017 Sears
9,739,128 B2 8/2017 Ghasripoor et al.
9,739,275 B2 8/2017 Robison et al.
9,759,054 B2 9/2017 Gay et al.
9,764,272 B2 9/2017 Martin et al.
9,835,018 B2 12/2017 Krish et al.
9,885,372 B2 2/2018 Arluck et al.
9,909,601 B2 3/2018 Heerdt
9,920,774 B2 3/2018 Ghasripoor et al.
9,945,210 B2 4/2018 Theodossiou
9,945,216 B2 4/2018 Ghasripoor et al.
9,970,281 B2 5/2018 Ghasripoor et al.
9,975,789 B2 5/2018 Ghasripoor et al.
9,976,573 B2 5/2018 Martin et al.
10,001,030 B2 6/2018 Krish et al.
10,006,524 B2 6/2018 Crump et al.
10,024,496 B2 7/2018 Hauge
10,030,372 B2 7/2018 Di Monte, Sr.
10,072,675 B2 9/2018 McLean et al.
10,119,379 B2 11/2018 Richter et al.
10,125,796 B2 11/2018 Hauge
10,138,907 B2 11/2018 Pinto et al.
10,161,421 B2 * 12/2018 Oklejas, Jr. ............... F04F 1/06
10,167,710 B2 1/2019 Ghasripoor et al.
10,167,712 B2 1/2019 Ghasripoor et al.
10,550,860 B2 2/2020 Perkins
11,274,681 B2 * 3/2022 Boyko .................... F04F 13/00
11,592,036 B2 * 2/2023 Judge .................... E21B 43/267
2002/0025264 A1 2/2002 Polizos et al.
2004/0118462 A1 6/2004 Baumann
2005/0103386 A1 5/2005 Magda
2005/0166978 A1 8/2005 Brueckmann et al.
2006/0145426 A1 7/2006 Schroeder et al.
2006/0196474 A1 9/2006 Magel
2006/0231577 A1 10/2006 Powling et al.
2007/0204916 A1 9/2007 Clayton et al.
2009/0057084 A1 3/2009 Mahawili
2009/0104046 A1 4/2009 Martin et al.

(56) References Cited

U.S. PATENT DOCUMENTS

| | | | |
|---|---|---|---|
| 2009/0313737 | A1 | 12/2009 | Richard |
| 2012/0024249 | A1 | 2/2012 | Fuhrmann et al. |
| 2012/0061595 | A1 | 3/2012 | Canjuga |
| 2012/0067825 | A1 | 3/2012 | Pique et al. |
| 2014/0026608 | A1 | 1/2014 | Manzo et al. |
| 2014/0048143 | A1 | 2/2014 | Lehner et al. |
| 2014/0150421 | A1 | 6/2014 | Sears |
| 2014/0284058 | A1 | 9/2014 | Watson et al. |
| 2015/0096739 | A1 | 4/2015 | Ghasripoor et al. |
| 2015/0130142 | A1 | 5/2015 | Zheng et al. |
| 2015/0184540 | A1 | 7/2015 | Winkler et al. |
| 2015/0292310 | A1 | 10/2015 | Ghasripoor et al. |
| 2016/0032691 | A1 | 2/2016 | Richter et al. |
| 2016/0032702 | A1 | 2/2016 | Gay et al. |
| 2016/0039054 | A1 | 2/2016 | Ghasripoor et al. |
| 2016/0062370 | A1 | 3/2016 | Gaines-Germain et al. |
| 2016/0101307 | A1 | 4/2016 | Montague |
| 2016/0102536 | A1 | 4/2016 | Knoeller |
| 2016/0138649 | A1 | 5/2016 | Anderson et al. |
| 2016/0146229 | A1 | 5/2016 | Martin et al. |
| 2016/0153551 | A1 | 6/2016 | Schiele et al. |
| 2016/0160849 | A1 | 6/2016 | Gains-Germain et al. |
| 2016/0160881 | A1 | 6/2016 | Anderson et al. |
| 2016/0160882 | A1 | 6/2016 | Morphew |
| 2016/0160887 | A1 | 6/2016 | Anderson |
| 2016/0160888 | A1 | 6/2016 | Morphew |
| 2016/0160889 | A1 | 6/2016 | Hoffman et al. |
| 2016/0160890 | A1 | 6/2016 | Anderson |
| 2016/0160917 | A1 | 6/2016 | Deshpande |
| 2016/0377096 | A1 | 12/2016 | Lehner et al. |
| 2017/0108131 | A1 | 4/2017 | Andersson |
| 2017/0130743 | A1 | 5/2017 | Anderson |
| 2017/0254474 | A1 | 9/2017 | Sauer |
| 2017/0306986 | A1 | 10/2017 | McLean et al. |
| 2017/0306987 | A1 | 10/2017 | Theodossiou |
| 2017/0350428 | A1 | 12/2017 | Martin et al. |
| 2017/0370500 | A1 | 12/2017 | Haines et al. |
| 2018/0030968 | A1 | 2/2018 | Verma |
| 2018/0056211 | A1 | 3/2018 | Seabrook et al. |
| 2018/0087364 | A1 | 3/2018 | Krish et al. |
| 2018/0094648 | A1 | 4/2018 | Hoffman et al. |
| 2018/0120197 | A1 | 5/2018 | Di Monte |
| 2018/0195370 | A1 | 7/2018 | Theodossiou |
| 2018/0209254 | A1 | 7/2018 | Ghasripoor et al. |
| 2018/0252239 | A1 | 9/2018 | Martin et al. |
| 2018/0306672 | A1 | 10/2018 | Pattom et al. |
| 2018/0347601 | A1 | 12/2018 | Hoffman et al. |
| 2019/0071340 | A1 | 3/2019 | Imrie |
| 2020/0149362 | A1 | 5/2020 | Terwilliger et al. |
| 2020/0149380 | A1 | 5/2020 | Procita et al. |
| 2020/0149556 | A1 | 5/2020 | Judge et al. |
| 2020/0149557 | A1 | 5/2020 | Le Doux, Jr. et al. |
| 2020/0149657 | A1 | 5/2020 | Christian et al. |
| 2020/0150698 | A1 | 5/2020 | Judge et al. |
| 2022/0154736 | A1 * | 5/2022 | Boyko ...................... F15B 3/00 |

FOREIGN PATENT DOCUMENTS

| | | | |
|---|---|---|---|
| CN | 206158951 | U | 5/2017 |
| EA | 7861 | | 2/2007 |
| EP | 0163897 | B1 | 7/1988 |
| EP | 1486706 | A1 | 12/2004 |
| EP | 1948942 | A1 | 7/2008 |
| EP | 3177429 | A1 | 6/2017 |
| GB | 0946494 | A | 1/1964 |
| JP | 6386657 | B2 | 9/2018 |
| NZ | 503937 | A | 6/2002 |
| RU | 2149287 | C1 | 5/2000 |
| RU | 2284423 | C1 | 9/2006 |
| RU | 2010145595 | A | 5/2012 |
| RU | 2496029 | C2 | 10/2013 |
| RU | 2511638 | C2 | 4/2014 |
| SG | 151056 | A1 | 5/2009 |
| SU | 10161 | A1 | 6/1929 |
| SU | 410199 | | 1/1974 |
| WO | WO1999017028 | | 4/1999 |
| WO | 02/66816 | A1 | 8/2002 |
| WO | 2010/031162 | A9 | 11/2010 |
| WO | 2015025094 | A1 | 2/2015 |
| WO | 2016014141 | A2 | 1/2016 |
| WO | 2016/022706 | A1 | 2/2016 |
| WO | 2016/063194 | A3 | 7/2016 |
| WO | 2017/083500 | A1 | 5/2017 |
| WO | 2018/035201 | A1 | 2/2018 |
| WO | 2018/085740 | A2 | 5/2018 |

OTHER PUBLICATIONS

Office Action dated Sep. 7, 2023, 25 pages.
Vorteq Pure Grit, This changes everything, Brochure, Energy Recovery Inc, 8 pages, Dec. 2014.

* cited by examiner

1100

1200

FLUID EXCHANGE DEVICES AND RELATED CONTROLS, SYSTEMS, AND METHODS

CROSS-REFERENCE TO RELATED APPLICATIONS

This application is a continuation of U.S. patent application Ser. No. 17/588,197, filed Jan. 28, 2022, for "FLUID EXCHANGE DEVICES AND RELATED CONTROLS, SYSTEMS, AND METHODS," which application is a continuation of U.S. patent application Ser. No. 16/950,904, filed Nov. 18, 2020, for "FLUID EXCHANGE DEVICES AND RELATED CONTROLS, SYSTEMS, AND METHODS," which application claims the benefit of the filing date of U.S. Provisional Patent Application Ser. No. 62/947,403, filed Dec. 12, 2019, for "FLUID EXCHANGE DEVICES AND RELATED CONTROLS, SYSTEMS, AND METHODS," the disclosure of each of which is incorporated herein in its entirety by reference.

TECHNICAL FIELD

The present disclosure relates generally to exchange devices. More particularly, embodiments of the present disclosure relate to fluid exchange devices for exchanging one or more of properties (e.g., pressure) between fluids and systems and methods.

BACKGROUND

Industrial processes often involve hydraulic systems including pumps, valves, impellers, etc. Pumps, valves, and impellers may be used to control the flow of the fluids used in the hydraulic processes. For example, some pumps may be used to increase (e.g., boost) the pressure in the hydraulic system, other pumps may be used to move the fluids from one location to another. Some hydraulic systems include valves to control where a fluid flows. Valves may include control valves, ball valves, gate valves, globe valves, check valves, isolation valves, combinations thereof, etc.

Some industrial processes involve the use of caustic fluids, abrasive fluids, and/or acidic fluids. These types of fluids may increase the amount of wear on the components of a hydraulic system. The increased wear may result in increased maintenance and repair costs or require the early replacement of equipment. For example, abrasive, caustic, or acidic fluid may increase the wear on the internal components of a pump such as an impeller, shaft, vanes, nozzles, etc. Some pumps are rebuildable and an operation may choose to rebuild a worn pump replacing the worn parts which may result in extended periods of downtime for the worn pump resulting in either the need for redundant pumps or a drop in productivity. Other operations may replace worn pumps at a larger expense but a reduced amount of downtime.

Well completion operations in the oil and gas industry often involve hydraulic fracturing (often referred to as fracking or fracing) to increase the release of oil and gas in rock formations. Hydraulic fracturing involves pumping a fluid (e.g., frac fluid, fracking fluid, etc.) containing a combination of water, chemicals, and proppant (e.g., sand, ceramics) into a well at high pressures. The high pressures of the fluid increases crack size and crack propagation through the rock formation releasing more oil and gas, while the proppant prevents the cracks from closing once the fluid is depressurized. Fracturing operations use high-pressure pumps to increase the pressure of the fracking fluid. However, the proppant in the fracking fluid increases wear and maintenance on and substantially reduces the operation lifespan of the high-pressure pumps due to its abrasive nature.

BRIEF SUMMARY

Some embodiments of the present disclosure may include a device for detecting properties of a piston. The device may include a coil arranged around a chamber. The device may further include a piston comprising one or more detection features (e.g., magnets) arranged annularly about a surface of the piston. The piston may be configured to travel within the chamber. The at least one coil may be configured to produce a signal based on a proximity of the one or more magnets.

In some embodiments, the at least one coil may comprise at least two coils, which may be spaced a first distance apart along an axis of the chamber. In some embodiments, the first distance is greater than about one inch (2.54 cm). In some embodiments, a third coil arranged around the chamber may be positioned a second distance from one of the at least two coils (e.g., where the first distance is equal to the second distance).

Another embodiment of the present disclosure may include a system for exchanging pressure between at least two fluid streams. The system may include a pressure exchange device for exchanging at least one property between fluids. The pressure exchange device may include at least one chamber. The at least one chamber may include a first end for receiving a clean fluid with a first property and a second end for receiving a dirty fluid with a second property. The chamber may further include at least one piston in the at least one chamber. The at least one piston may be configured to separate the clean fluid from the dirty fluid. The chamber may also include a valve device configured to selectively place the clean fluid in communication with the dirty fluid through the at least one piston in order to at least partially transfer the first property of the clean fluid to the dirty fluid. The chamber may further include at least one sensor comprising at least one coil arranged circumferentially about the at least one chamber. The sensor may be configured to detect a property (e.g., speed, position, acceleration, jerk) of the at least one piston.

Another embodiment of the present disclosure may include a method of measuring a velocity of a piston. The method may include passing a piston through at least one sensor (e.g., a first coil). The method may further include inducing an electrical property (e.g., a current and/or a voltage) in the first coil with the piston. The method may also include measuring a change in the current in the first coil over time. The method may further include calculating a velocity of the piston based on the change in the current in the first coil.

Another embodiment of the present disclosure may include a method of controlling a pressure exchange device. The method may include supplying a high-pressure clean fluid to a high-pressure inlet of a valve configured to direct flow of the high-pressure clean fluid to a first chamber. The method may further include transferring a first pressure from the high-pressure clean fluid to a low-pressure dirty fluid through a first piston in the first chamber. The method may also include receiving a low-pressure dirty fluid in a second chamber. The method may also include monitoring a location of the first piston and the second piston. The method may further include changing a position of the valve responsive the location of the second piston. The method may also include stopping flow of the low-pressure clean fluid from the second chamber while maintaining flow of the high-pressure clean fluid into the first chamber for a dwell period. The method may further include redirecting the flow of the high-pressure clean fluid to the second chamber after the dwell period.

In some embodiments, the method further includes changing the dwell period responsive the location of the first piston. In some embodiments, the method further includes monitoring one or more of a velocity or an acceleration of the first piston and changing the dwell period responsive to the one or more of the velocity or the acceleration of the first piston Another embodiment of the present disclosure may include a system for exchanging pressure between at least two fluid streams. The system may include a first chamber. The first chamber may include a first clean end configured to receive a clean fluid. The first chamber may further include a first dirty end configured to receive a dirty fluid. The first chamber may also include a first piston configured to separate the clean fluid from the dirty fluid. The first chamber may further include a first clean side piston sensor comprising at least one first clean side piston sensor coil configured to detect one or more properties of a motion of the first piston. The first chamber may also include a first dirty side piston sensor comprising at least one first dirty side piston sensor coil configured to detect one or more properties of the motion of the first piston. The system may further include a second chamber. The second chamber may include a second clean end configured to receive the clean fluid. The second chamber may further include a second dirty end configured to receive the dirty fluid. The second chamber may also include a second piston configured to separate the clean fluid from the dirty fluid. The second chamber may further include a second clean side piston sensor comprising at least one second clean side piston sensor coil configured to detect one or more properties of a motion of the second piston. The second chamber may also include a second dirty side piston sensor comprising at least one second dirty side piston sensor coil configured to detect one or more properties of the motion of the second piston. The system may further include a valve device configured to selectively place the clean fluid in communication with the dirty fluid through at least one of the first piston and the second piston.

In some embodiments, the first dirty side piston sensor is configured to detect if the first piston passes the first dirty side piston sensor; and wherein the second dirty side piston sensor is configured to detect if the second piston passes the second dirty side piston sensor.

In some embodiments, the first clean side piston sensor is configured to detect a velocity of the first piston; and wherein the second clean side piston sensor is configured to detect a velocity of the second piston.

In some embodiments, the first dirty side piston sensor is configured to detect a velocity of the first piston, and wherein the second dirty side piston sensor is configured to detect a velocity of the second piston.

Another embodiment of the present disclosure may include a system for exchanging pressure between at least two fluid streams. The system may include at least two pressure exchanging devices. The pressure exchanging devices may include a first chamber and a first piston configured to travel in the first chamber. The pressure exchanging devices may further include a second chamber and a second piston configured to travel in the second chamber. The pressure exchanging devices may also include a control valve configured to control movement of the first piston and the second piston by selectively directing flow of a high-pressure clean fluid into one or more of the first chamber and the second chamber. The first piston and the second piston may be configured to exchange pressure from the high-pressure clean fluid to a low-pressure dirty fluid. The control valve may be configured to maintain a substantially 180 degree cycle difference between the first piston and the second piston. The control valve of a first pressure exchanging device may be configured to maintain a cycle of the first piston and the second piston of the first pressure exchanging device at an equal cycle difference from the first piston and the second piston of a second pressure exchanging device.

In some embodiments, the system may include a third pressure exchanging device, wherein the equal cycle difference is 120 degrees.

Another embodiment of the present disclosure may include a method of detecting a piston comprising: detecting a piston with a first sensor; measuring a voltage level in the first sensor; detecting the piston with a second sensor; measuring a voltage level in the second sensor; and comparing the voltage level in the first sensor with the voltage level in the second sensor to determine of the piston has passed by both the first sensor and the second sensor.

Another embodiment of the present disclosure may include a method of measuring a velocity of a piston comprising: passing a piston through a first sensor; measuring a change in a voltage in the first sensor over time responsive to the passing of the piston; calculating a velocity utilizing the change in the voltage over time; if the velocity is over a threshold velocity level, measuring another change in a voltage in the first sensor over time responsive to the passing of the piston; and calculating another velocity utilizing the another change in the voltage over time.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
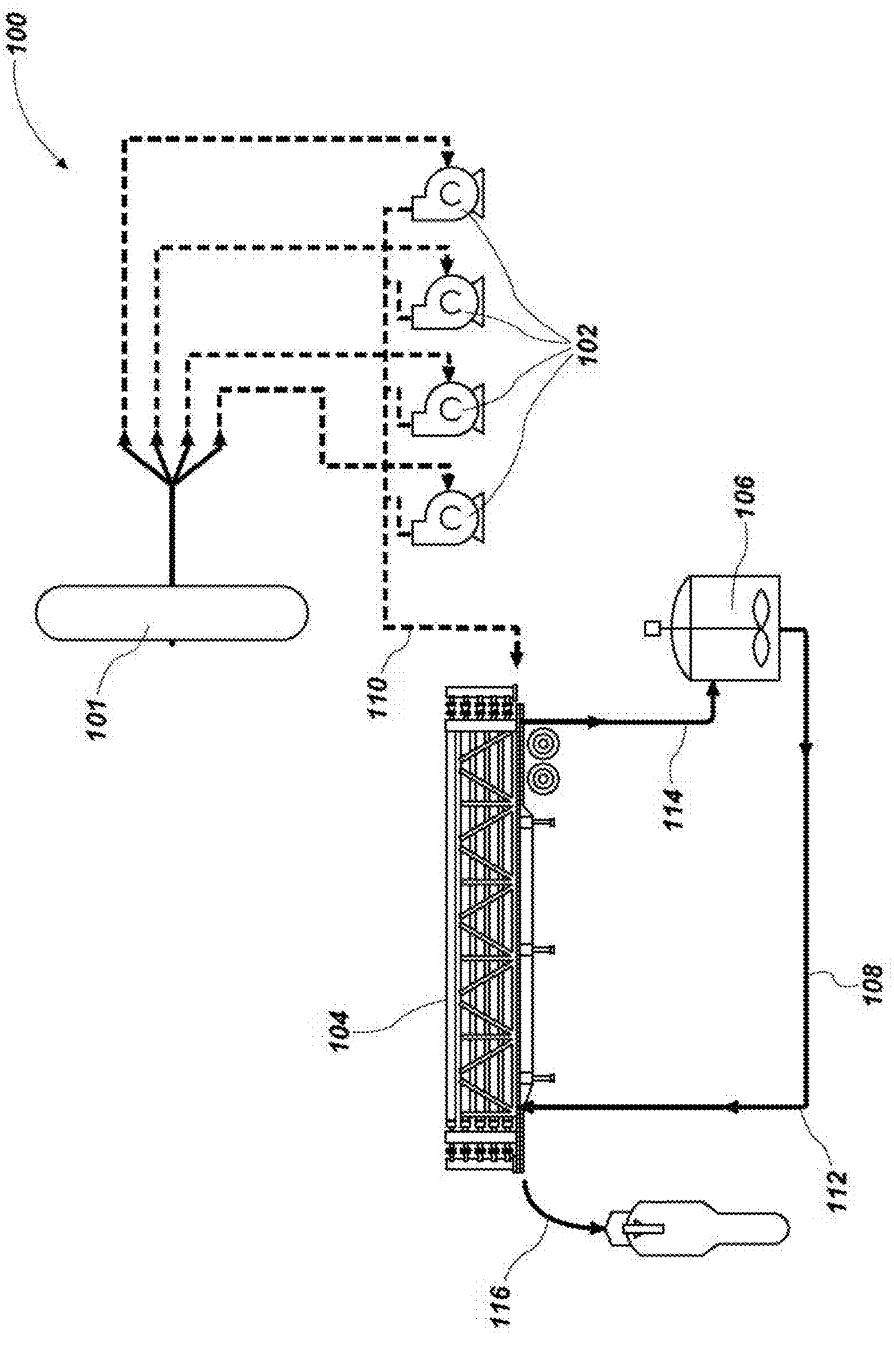
FIG. 1 is schematic view of a hydraulic fracturing system according to an embodiment of the present disclosure.

The illustrations presented herein are not meant to be actual views of any particular fluid exchanger or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein. In some embodiments, the term fluid includes gases, liquids, and/or pumpable mixtures of liquids and solids.

Embodiments of the present disclosure may relate to exchange devices that may be utilized to exchange one or more properties between fluids (e.g., a pressure exchanger). Such exchangers (e.g., pressure exchangers) are sometimes called "flow-work exchangers" or "isobaric devices" and are machines for exchanging pressure energy from a relatively high-pressure flowing fluid system to a relatively low-pressure flowing fluid system.

In some industrial processes, elevated pressures are required in certain parts of the operation to achieve the desired results, following which the pressurized fluid is depressurized. In other processes, some fluids used in the process are available at high-pressures and others at low-pressures, and it is desirable to exchange pressure energy between these two fluids. As a result, in some applications, great improvement in economy can be realized if pressure can be efficiently transferred between two fluids.

In some embodiments, exchangers as disclosed herein may be similar to and include the various components and configurations of the pressure exchangers disclosed in U.S. Pat. No. 5,797,429 to Shumway, issued Aug. 25, 1998, the disclosure of which is hereby incorporated herein in its entirety by this reference.

Although some embodiments of the present disclosure are depicted as being used and employed as a pressure exchanger between two or more fluids, persons of ordinary skill in the art will understand that the embodiments of the present disclosure may be employed in other implementations such as, for example, the exchange of other properties (e.g., temperature, density, etc.) and/or composition between one or more fluids and/or mixing of two or more fluids.

In some embodiments, a pressure exchanger may be used to protect moving components (e.g., pumps, valves, impellers, etc.) in processes were high pressures are needed in a fluid that has the potential to damage the moving components (e.g., abrasive fluid, caustic fluid, acidic fluid, etc.).

For example, pressure exchange devices according to embodiments of the disclosure may be implemented in hydrocarbon related processes, such as, hydraulic fracturing or other drilling operations (e.g., subterranean downhole drilling operations).

As discussed above, well completion operations in the oil and gas industry often involve hydraulic fracturing, drilling operations, or other downhole operations that use high-pressure pumps to increase the pressure of the downhole fluid (e.g., fluid that is intended to be conducted into a subterranean formation or borehole, such as, fracking fluid, drilling fluid, drilling mud). The proppants, chemicals, additives to produce mud, etc. in these fluids often increase wear and maintenance on the high-pressure pumps.

In some embodiments, a hydraulic fracturing system may include a hydraulic energy transfer system that transfers pressure between a first fluid (e.g., a clean fluid, such as a partially (e.g., majority) or substantially proppant free fluid or a pressure exchange fluid) and a second fluid (e.g., fracking fluid, such as a proppant-laden fluid, an abrasive fluid, or a dirty fluid). Such systems may at least partially (e.g., substantially, primarily, entirely) isolate the high-pressure first fluid from the second dirty fluid while still enabling the pressurizing of the second dirty fluid with the high-pressure first fluid and without having to pass the second dirty fluid directly through a pump or other pressurizing device.

While some embodiments discussed herein may be directed to fracking operations, in additional embodiments, the exchanger systems and devices disclosed herein may be utilized in other operations. For example, devices, systems, and/or method disclosed herein may be used in other downhole operations, such as, for example, downhole drilling operations.

FIG. 1 illustrates a system diagram of an embodiment of hydraulic fracturing system 100 utilizing a pressure exchanger between a first fluid stream (e.g., clean fluid stream) and a second fluid stream (e.g., a fracking fluid stream). Although not explicitly described, it should be understood that each component of the system 100 may be directly connected or coupled via a fluid conduit (e.g., pipe) to an adjacent (e.g., upstream or downstream) component. The hydraulic fracturing system 100 may include one or more devices for pressurizing the first fluid stream, such as, for example, frack pumps 102 (e.g., reciprocating pumps, centrifugal pumps, scroll pumps, etc.). The system 100 may include multiple frack pumps 102, such as at least two frack pumps 102, at least four frack pumps 102, at least ten frack pumps 102, at least sixteen frack pumps, or at least twenty frack pumps 102. In some embodiments, the frack pumps 102 may provide relatively and substantially clean fluid at a high pressure to a pressure exchanger 104 from a fluid source 101. In some embodiments, fluid may be provided separately to each pump 102 (e.g., in a parallel configuration). After pressurization in the pumps 102, the high-pressure clean fluid 110 may be combined and transmitted to the pressure exchanger 104 (e.g., in a serial configuration).

As used herein, "clean" fluid may describe fluid that is at least partially or substantially free (e.g., substantially entirely or entirely free) of chemicals and/or proppants typically found in a downhole fluid and "dirty" fluid may describe fluid that at least partially contains chemicals, other additives, and/or proppants typically found in a downhole fluid.

The pressure exchanger 104 may transmit the pressure from the high-pressure clean fluid 110 to a low-pressure fracking fluid (e.g., fracking fluid 112) in order to provide a high-pressure fracking fluid 116. The clean fluid may be expelled from the pressure exchanger 104 as a low-pressure fluid 114 after the pressure is transmitted to the low-pressure fracking fluid 112. In some embodiments, the low-pressure fluid 114 may be an at least partially or substantially clean fluid that substantially lacks chemicals and/or proppants aside from a small amount that may be passed to the low-pressure fluid 114 from the fracking fluid 112 in the pressure exchanger 104.

In some embodiments, the pressure exchanger 104 may include one or more pressure exchanger devices (e.g., operating in parallel). In such configurations, the high pressure inputs may be separated and provided to inputs of each of the pressure exchanger devices. The outputs of each of the pressure exchanger devices may be combined as the high-pressure fracking fluid exits the pressure exchanger 104. For example, and as discussed below with reference to FIG. 4, the pressure exchanger 104 may include two or more (e.g., three) pressure exchanger devices operating in parallel. As depicted, the pressure exchanger 104 may be provided on a mobile platform (e.g., a truck trailer) that may be relatively easily installed and removed from a fracking well site.

After being expelled from the pressure exchanger 104, the low-pressure clean fluid 114 may travel to and be collected in a mixing chamber 106 (e.g., blender unit, mixing unit, etc.). In some embodiments, the low-pressure fluid 114 may be converted (e.g., modified, transformed, etc.) to the low-pressure fracking fluid 112 in the mixing chamber 106. For example, a proppant may be added to the low-pressure clean fluid 114 in the mixing chamber 106 creating a low-pressure fracking fluid 112. In some embodiments, the low-pressure clean fluid 114 may be expelled as waste.

In many hydraulic fracturing operations, a separate process may be used to heat the fracking fluid 112 before the fracking fluid 112 is discharged downhole (e.g., to ensure proper blending of the proppants in the fracking fluid). In some embodiments, using the low-pressure clean fluid 114 to produce the fracking fluid 112 may eliminate the step of heating the fracking fluid. For example, the low-pressure clean fluid 114 may be at an already elevated temperature as a result of the fracking pumps 102 pressurizing the high-pressure clean fluid 110. After transferring the pressure in the high-pressure clean fluid 110 that has been heated by the frack pumps 102, the now low-pressure clean fluid 114 retains at least some of that heat energy as it is passed out of the pressure exchanger 104 to the mixing chamber 106. In some embodiments, using the low-pressure clean fluid 114 at an already elevated temperature to produce the fracking fluid may result in the elimination of the heating step for the fracking fluid. In other embodiments, the elevated temperature of the low-pressure clean fluid 114 may result in a reduction of the amount of heating required for the fracking fluid.

After the proppant is added to the low-pressure now fracking fluid 112, the low-pressure fracking fluid 112 may be expelled from the mixing chamber 106. The low-pressure fracking fluid 112 may then enter the pressure exchanger 104 on the fracking fluid end through a fluid conduit 108 connected (e.g., coupled) between the mixing chamber 106 and the pressure exchanger 104. Once in the pressure exchanger 104, the low-pressure fracking fluid 112 may be pressurized by the transmission of pressure from the high-pressure clean fluid 110 through the pressure exchanger 104. The high-pressure fracking fluid 116 may then exit the pressure exchanger 104 and be transmitted downhole.

Hydraulic fracturing systems generally require high operating pressures for the high-pressure fracking fluid 116. In some embodiments, the desired pressure for the high-pressure fracking fluid 116 may be between about 8,000 PSI (55,158 kPa) and about 12,000 PSI (82,737 kPa), such as between about 9,000 PSI (62,052 kPa) and about 11,000 PSI (75,842 kPa), or about 10,000 PSI (68,947 kPa).

In some embodiments, the high-pressure clean fluid 110 may be pressurized to a pressure at least substantially the same or slightly greater than the desired pressure for the high-pressure fracking fluid 116. For example, the high-pressure clean fluid 110 may be pressurized to between about 0 PSI (0 kPa) and about 1000 PSI (6,894 kPa) greater than the desired pressure for the high-pressure fracking fluid 116, such as between about 200 PSI (1,379 kPa) and about 700 PSI (4,826 kPa) greater than the desired pressure, or between about 400 PSI (2,758 kPa) and about 600 PSI (4,137 kPa) greater than the desired pressure, to account for any pressure loss during the pressure and exchange process.

Figure 2:
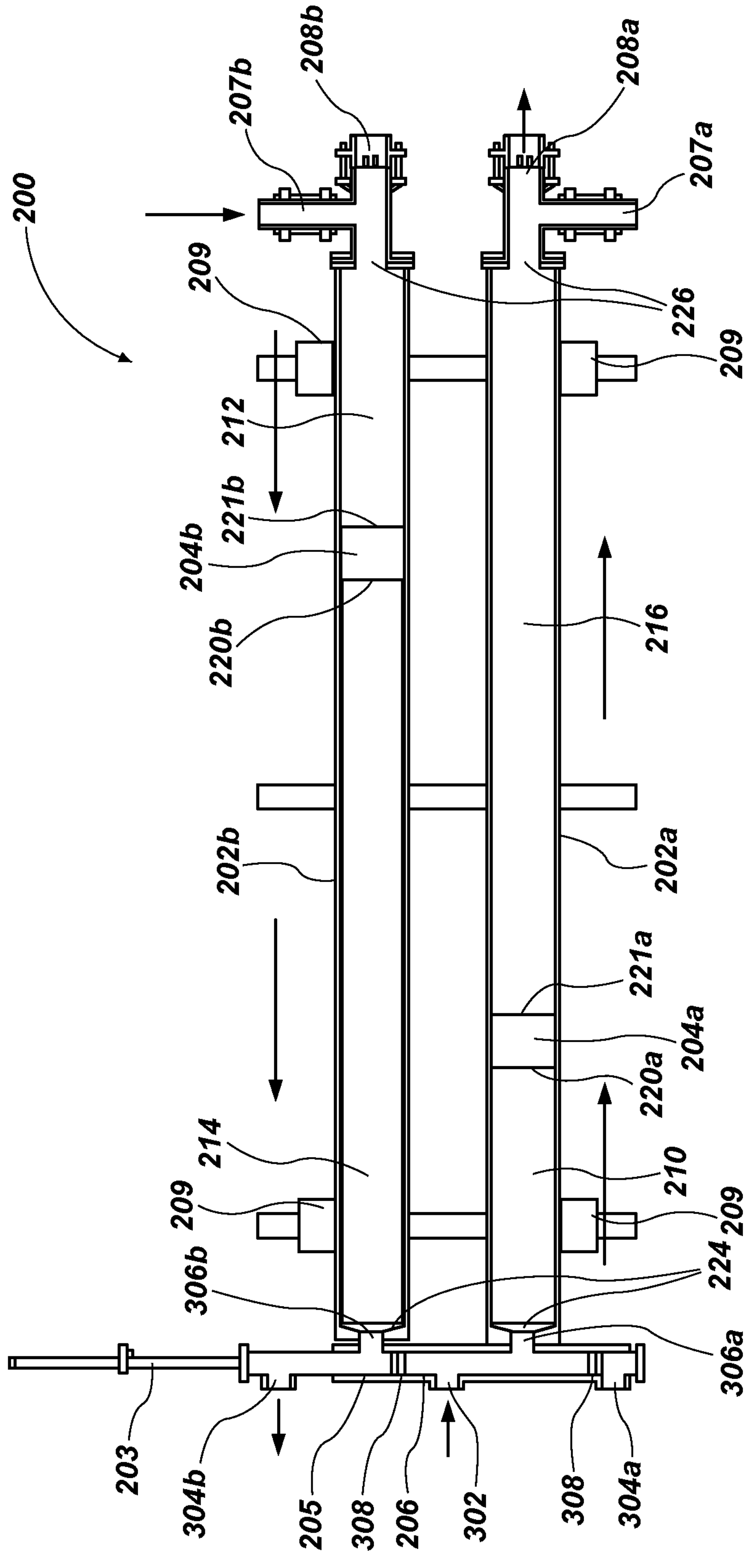
FIG. 2 is cross-sectional view of a fluid exchanger device according to an embodiment of the present disclosure.

FIG. 2 illustrates an embodiment of a pressure exchanger 200. The pressure exchanger 200 may be a linear pressure exchanger in the sense that it is operated by moving or translating an actuation assembly substantially along a linear path. For example, the actuation assembly may be moved linearly to selectively place the low- and high-pressure fluids in at least partial communication (e.g., indirect communication where the pressure of the high-pressure fluid may be transferred to the low-pressure fluid) as discussed below in greater detail.

The linear pressure exchanger 200 may include one or more (e.g., two) chambers 202*a*, 202*b* (e.g., tanks, collectors, cylinders, tubes, pipes, etc.). The chambers 202*a*, 202*b* (e.g., parallel chambers 202*a*, 202*b*) may include pistons 204*a*, 204*b* configured to substantially maintain the high-pressure clean fluid 210 and low-pressure clean fluid 214 (e.g., the clean side) separate from the high-pressure dirty fluid 216 and the low-pressure dirty fluid 212 (e.g., the dirty side) while enabling transfer of pressure between the respective fluids 210, 212, 214, and 216. The pistons 204*a*, 204*b* may be sized (e.g., the outer diameter of the pistons 204*a*, 204*b* relative to the inner diameter of the chambers 202*a*, 202*b*) to enable the pistons 204*a*, 204*b* to travel through the chamber 202*a*, 202*b* while minimizing fluid flow around the pistons 204*a*, 204*b*.

The linear pressure exchanger 200 may include a clean control valve 206 (e.g., having a control system) configured to control the flow of high-pressure clean fluid 210 and low-pressure clean fluid 214. Each of the chambers 202*a*, 202*b* may include one or more dirty control valves 207*a*, 207*b*, 208*a*, and 208*b* configured to control the flow of the low-pressure dirty fluid 212 and the high-pressure dirty fluid 216.

While the embodiment of FIG. 2 contemplates a linear pressure exchanger 200, other embodiments, may include other types of pressure exchangers that involve other mechanisms for selectively placing the low- and high-pressure fluids in at least partial communication (e.g., a rotary actuator such as those disclosed in U.S. Pat. No. 9,435,354, issued Sep. 6, 2016, the disclosure of which is hereby incorporated herein in its entirety by this reference, etc.).

In some embodiments, the clean control valve 206, which includes an actuation stem 203 that moves one or more stoppers 308 along (e.g., linearly along) a body 205 of the valve 206, may selectively allow (e.g., input, place, etc.) high-pressure clean fluid 210 provided from a high-pressure inlet port 302 to enter a first chamber 202*a* on a clean side 220*a* of the piston 204*a*. The high-pressure clean fluid 210 may act on the piston 204*a* moving the piston 204*a* in a direction toward the dirty side 221*a* of the piston 204*a* and compressing the dirty fluid in the first chamber 202*a* to produce the high-pressure dirty fluid 216. The high-pressure dirty fluid 216 may exit the first chamber 202*a* through the dirty discharge control valve 208*a* (e.g., outlet valve, high-pressure outlet). At substantially the same time, the low-pressure dirty fluid 212 may be entering the second chamber 202*b* through the dirty fill control valve 207*b* (e.g., inlet valve, low-pressure inlet). The low-pressure dirty fluid 212 may act on the dirty side 221*b* of the piston 204*b* moving the piston 204*b* in a direction toward the clean side 220*b* of the piston 204*b* in the second chamber 202*b*. The low-pressure clean fluid 214 may be discharged (e.g., emptied, expelled, etc.) through the clean control valve 206 as the piston 204*b* moves in a direction toward the clean side 220*b* of the piston 204*b* reducing the space on the clean side 220*b* of the piston 204*b* within the second chamber 202*b*. A cycle of the pressure exchanger is completed once each piston 204*a*, 204*b* moves the substantial length (e.g., the majority of the length) of the respective chamber 202*a*, 202*b* (which "cycle" may be a half cycle with the piston 204*a*, 204*b* moving in one direction along the length of the chamber 202*a*, 202*b* and a full cycle includes the piston 204*a*, 204*b* moving in the one direction along the length of the chamber 202*a*, 202*b* and then moving in the other direction to return to substantially the original position). In some embodiments, only a portion of the length may be utilized (e.g., in reduced capacity situations). Upon the completion of a cycle, the actuation stem 203 of the clean control valve 206 may change positions enabling the high-pressure clean fluid 210 to enter the second chamber 202*b*, thereby changing the second chamber 202*b* to a high-pressure chamber and changing the first chamber 202*a* to a low-pressure chamber and repeating the process.

In some embodiments, each chamber 202*a*, 202*b* may have a higher pressure on one side of the pistons 204*a*, 204*b* to move the piston in a direction away from the higher pressure. For example, the high-pressure chamber may experience pressures between about 8,000 PSI (55,158 kPa) and about 13,000 PSI (89,632 kPa) with the highest pressures being in the high-pressure clean fluid 210 to move the piston 204*a*, 204*b* away from the high-pressure clean fluid 210 compressing and discharging the dirty fluid to produce the high-pressure dirty fluid 216. The low-pressure chamber 202*a*, 202*b* may experience much lower pressures, relatively, with the relatively higher pressures in the currently low-pressure chamber 202*a*, 202*b* still being adequate enough in the low-pressure dirty fluid 212 to move the piston 204*a*, 204*b* in a direction away from the low-pressure dirty fluid 212 discharging the low-pressure clean fluid 214. In some embodiments, the pressure of the low-pressure dirty fluid 212 may be between about 100 PSI (689 kPa) and about 700 PSI (4,826 kPa), such as between about 200 PSI (1,379 kPa) and about 500 PSI (3,447 kPa), or between about 300 PSI (2,068 kPa) and about 400 PSI (2758 kPa).

Referring back to FIG. 1, in some embodiments, the hydraulic fracturing system 100 may include an optional device (e.g., a pump) to pressurize the low-pressure dirty fluid 212 (e.g., to a pressure level that is suitable to move the piston 204*a*, 204*b* toward the clean side) as it is being provided into the chambers 202*a*, 202*b*.

Referring again to FIG. 2, if any fluid pushes past the piston 204*a*, 204*b* (e.g., leak by, blow by, etc.) it will generally tend to flow from the higher pressure fluid to the lower pressure fluid. The high-pressure clean fluid 210 may be maintained at the highest pressure in the system such that the high-pressure clean fluid 210 may not generally become substantially contaminated. The low-pressure clean fluid 214 may be maintained at the lowest pressure in the system. Therefore, it is possible that the low-pressure clean fluid 214 may become contaminated by the low-pressure dirty fluid 212. In some embodiments, the low-pressure clean fluid 214 may be used to produce the low-pressure dirty fluid 212 substantially nullifying any detriment resulting from the contamination. Likewise, any contamination of the high-pressure dirty fluid 216 by the high-pressure clean fluid 210 would have minimal effect on the high-pressure dirty fluid 216.

In some embodiments, the dirty control valves 207*a*, 207*b*, 208*a*, 208*b* may be check valves (e.g., clack valves, non-return valves, reflux valves, retention valves, or one-way valves). For example, one or more of the dirty control valves 207*a*, 207*b*, 208*a*, 208*b* may be a ball check valve, diaphragm check valve, swing check valve, tilting disc check valve, clapper valve, stop-check valve, lift-check valve, in-line check valve, duckbill valve, etc. In additional embodiments, one or more of the dirty control valves 207*a*, 207*b*, 208*a*, 208*b* may be actuated valves (e.g., solenoid valves, pneumatic valves, hydraulic valves, electronic valves, etc.) configured to receive a signal from a controller and open or close responsive the signal.

The dirty control valves 207*a*, 207*b*, 208*a*, 208*b* may be arranged in opposing configurations such that when the chamber 202*a*, 202*b* is in the high-pressure configuration the high-pressure dirty fluid opens the dirty discharge control valve 208*a*, 208*b* while the pressure in the chamber 202*a*, 202*b* holds the dirty fill control valve 207*a*, 207*b* closed. For example, the dirty discharge control valve 208*a*, 208*b* comprises a check valve that opens in a first direction out of the chamber 202*a*, 202*b*, while the dirty fill control valve 207*a*, 207*b* comprises a check valve that opens in a second, opposing direction into the chamber 202*a*, 202*b*.

The dirty discharge control valves 208*a*, 208*b* may be connected to a downstream element (e.g., a fluid conduit, a separate or common manifold) such that the high pressure in the downstream element holds the dirty discharge control valve 208*a*, 208*b* closed in the chamber 202*a*, 202*b* that is in the low-pressure configuration. Such a configuration enables the low-pressure dirty fluid to open the dirty fill control valve 207*a*, 207*b* and enter the chamber 202*a*, 202*b*.

Figure 3A:
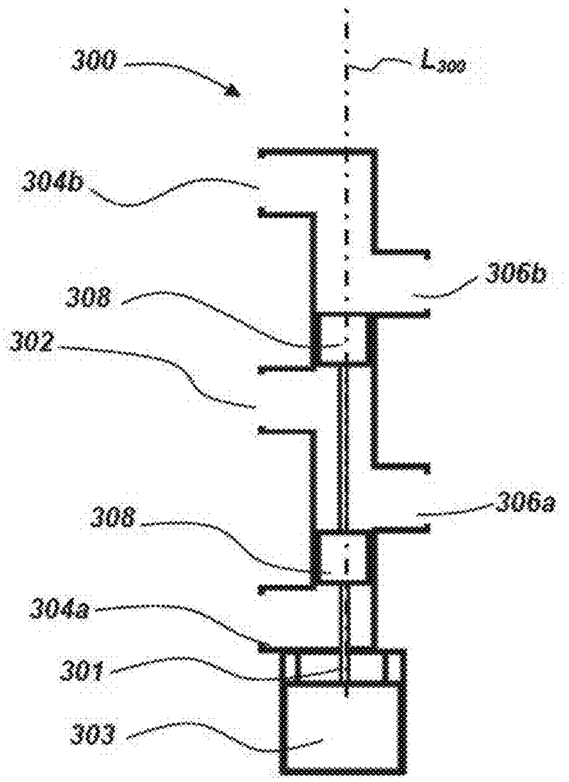
FIG. 3A is a cross-sectional view of a control valve in a first position according to an embodiment of the present disclosure.
Figure 3B:
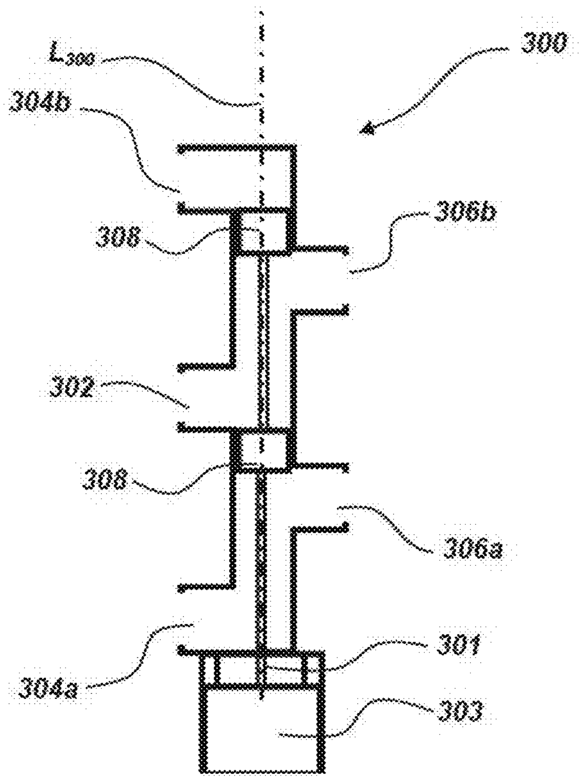
FIG. 3B is a cross-sectional view of a control valve in a second position according to an embodiment of the present disclosure.

FIGS. 3A and 3B illustrate a cross sectional view of an embodiment of a clean control valve 300 at two different positions. In some embodiments, the clean control valve 300 may be similar to the clean control valve 206 discussed above. The clean control valve 300 may be a multiport valve (e.g., 4 way valve, 5 way valve, LinX® valve, etc.). The clean control valve 300 may have one or more high-pressure inlet ports (e.g., one port 302), one or more low-pressure outlet ports (e.g., two ports 304*a*, 304*b*), and one or more chamber connection ports (e.g., two ports 306*a*, 306*b*). The clean control valve 300 may include at least two stoppers 308 (e.g., plugs, pistons, discs, valve members, etc.). In some embodiments, the clean control valve 300 may be a linearly actuated valve. For example, the stoppers 308 may be linearly actuated such that the stoppers 308 move along a substantially straight line (e.g., along a longitudinal axis L300 of the clean control valve 300).

The clean control valve 300 may include an actuator 303 configured to actuate the clean control valve 300 (e.g., an actuator coupled to a valve stem 301 of the clean control valve 300). In some embodiments, the actuator 303 may be electronic (e.g., solenoid, rack and pinion, ball screw, segmented spindle, moving coil, etc.), pneumatic (e.g., tie rod cylinders, diaphragm actuators, etc.), or hydraulic. In some embodiments, the actuator 303 may enable the clean control valve 300 to move the valve stem 301 and stoppers 308 at variable rates (e.g., changing speeds, adjustable speeds, etc.).

FIG. 3A illustrates the clean control valve 300 in a first position. In the first position, the stoppers 308 may be positioned such that the high-pressure clean fluid may enter the clean control valve 300 through the high-pressure inlet port 302 and exit into a first chamber through the chamber connection port 306*a*. In the first position, the low-pressure clean fluid may travel through the clean control valve 300 between the chamber connection port 306*b* and the low-pressure outlet port 304*b* (e.g., may exit through the low-pressure outlet port 304*b*).

FIG. 3B illustrates the clean control valve 300 in a second position. In the second position, the stoppers 308 may be positioned such that the high-pressure clean fluid may enter the clean control valve 300 through the high-pressure inlet port 302 and exit into a second chamber through the chamber connection port 306*b*. The low-pressure clean fluid may travel through the clean control valve 300 between the chamber connection port 306*a* and the low-pressure outlet port 304*a* (e.g., may exit through the low-pressure outlet port 304*a*).

Now referring to FIGS. 2, 3A, and 3B, the clean control valve 206 is illustrated in the first position with the high-pressure inlet port 302 connected to the chamber connection port 306*a* providing high-pressure clean fluid to the first chamber 202*a*. Upon completion of the cycle, the clean control valve 206 may move the stoppers 308 to the second position thereby connecting the high-pressure inlet port 302 to the second chamber 202*b* through the chamber connection port 306*b*.

In some embodiments, the clean control valve 206 may pass through a substantially fully closed position in the middle portion of a stroke between the first position and the second position. For example, in the first position, the stoppers 308 may maintain a fluid pathway between the high-pressure inlet port 302 and the chamber connection port 306*a* and a fluid pathway between the chamber connection port 306*b* and the low-pressure outlet port 304*b*. In the second position, the stoppers 308 may maintain a fluid pathway between the high-pressure inlet port 302 and the chamber connection port 306*b* and a fluid pathway between the chamber connection port 306*a* and the low-pressure outlet port 304*a*. Transitioning between the first and second positions may involve at least substantially closing both fluid pathways to change the connection of the chamber connection port 306*a* from the high-pressure inlet port 302 to the low-pressure outlet port 304*a* and to change the connection of the chamber connection port 306*b* from the low-pressure outlet port 304*b* to the high-pressure inlet port 302. The fluid pathways may at least substantially close at a middle portion of the stroke to enable the change of connections.

Opening and closing valves, where fluids are operating at high pressures, may result in pressure pulsations (e.g., water hammer) that can result in damage to components in the system when high pressure is suddenly introduced or removed from the system. As a result, pressure pulsations may occur in the middle portion of the stroke when the fluid pathways are closing and opening respectively.

In some embodiments, the actuator 303 may be configured to move the stoppers 308 at variable speeds along the stroke of the clean control valve 206. As the stoppers 308 move from the first position to the second position, the stoppers 308 may move at a high rate of speed while traversing a first portion of the stroke that does not involve newly introducing flow from the high-pressure inlet port 302 into the chamber connection ports 306*a*, 306*b*. The stoppers 308 may decelerate to a low rate of speed as the stoppers 308 approach a closed position (e.g., when the stoppers 308 block the chamber connection ports 306*a*, 306*b* during the transition between the high-pressure inlet port 302 connection and the low-pressure outlet port 304*a*, 304*b* connection) at a middle portion of the stroke. The stoppers 308 may continue at a lower rate of speed, as the high-pressure inlet port 302 is placed into communication with one of the chamber connection ports 306*a*, 306*b*. After, traversing the chamber connection ports 306*a*, 306*b*, the stoppers 308 may accelerate to another high rate of speed as the stoppers 308 approach the second position. The low rate of speed in the middle portion of the stroke may reduce the speed that the clean control valve 206 opens and closes enabling the clean control valve to gradually introduce and/or remove the high pressure from the chambers 202*a*, 202*b*.

In some embodiments, the stoppers 308 may be arranged such that flow out of one of the chamber connection ports 306*a*, 306*b* may be stopped while high-pressure flow into another of the chamber connection ports 306*a*, 306*b* may continue. For example, such an arrangement may enable the clean control valve 300 to control motion of the pistons 204*a*, 204*b* within the chambers 202*a*, 202*b* individually.

In some embodiments, the motion of the pistons 204*a*, 204*b* may be controlled by regulating the rate of fluid flow (e.g., of the incoming fluid) and/or a pressure differential between the clean side 220*a*, 220*b* of the pistons 204*a*, 204*b*, and the dirty side 221*a*, 221*b* of the pistons 204*a*, 204*b* at least partially with the movement of the clean control valve 206. In some embodiments, it may be desirable for the piston 204*a*, 204*b* in the low-pressure chamber 202*a*, 202*b* to move at substantially the same speed as the piston 204*a*, 204*b* in the high-pressure chamber 202*a*, 202*b* either by manipulating their pressure differentials in each chamber and/or by controlling the flow rates of the fluid in and out of the chambers 202*a*, 202*b*. However, the piston 204*a*, 204*b* in the low-pressure chamber 202*a*, 202*b* may tend to move at a greater speed than the piston 204*a*, 204*b* in the high-pressure chamber 202*a*, 202*b*.

In some embodiments, the rate of fluid flow and/or the pressure differential may be varied to control acceleration and deceleration of the pistons 204*a*, 204*b* (e.g., by manipulating and/or varying the stroke of the clean control valve 206 and/or by manipulating the pressure in the fluid streams with one or more pumps). For example, increasing the flow rate and/or the pressure of the high-pressure clean fluid 210 when the piston 204*a*, 204*b* is near a clean end 224 of the chamber 202*a*, 202*b* at the beginning of the high-pressure stroke may increase the rate of fluid flow and/or the pressure differential in the chamber 202*a*, 202*b*. Increasing the rate of fluid flow and/or the pressure differential may cause the piston 204*a*, 204*b* to accelerate to or move at a faster rate. In another example, the flow rate and/or the pressure of the high-pressure clean fluid 210 may be decreased when the piston 204*a*, 204*b* approaches a dirty end 226 of the chamber 202*a*, 202*b* at the end of the high-pressure stroke. Decreasing the rate of fluid flow and/or the pressure differential may cause the piston 204*a*, 204*b* to decelerate and/or stop before reaching the dirty end of the respective chamber 202*a*, 202*b*.

Similar control with the stroke of the clean control valve 206 may be utilized to prevent the piston 204*a*, 204*b* from traveling to the furthest extent of the clean end of the chambers 202*a*, 202*b*. For example, the clean control valve 206 may close off one of the chamber connection ports 306*a*, 306*b* before the piston 204*a*, 204*b* contacts the furthest extent of the clean end of the chambers 202*a*, 202*b* by preventing any further fluid flow and slowing and/or stopping the piston 204*a*, 204*b*. In some embodiments, the clean control valve 206 may open one the chamber connection ports 306*a*, 306*b* into communication with the high-pressure inlet port 302 before the piston 204*a*, 204*b* contacts the furthest extent of the clean end of the chambers 202*a*, 202*b* in order to slow, stop, and/or reverse the motion of the piston 204*a*, 204*b*.

If the pistons 204*a*, 204*b* reach the clean end 224 or dirty end 226 of the respective chambers 202*a*, 202*b* the higher pressure fluid may bypass the piston 204*a*, 204*b* and mix with the lower pressure fluid. In some embodiments, mixing the fluids may be desirable. For example, if the pistons 204*a*, 204*b* reach the dirty end 226 of the respective chambers 202*a*, 202*b* during the high-pressure stroke, the high-pressure clean fluid 210 may bypass the piston 204*a*, 204*b* (e.g., by traveling around the piston 204*a*, 204*b* or through a valve in the piston 204*a*, 204*b*) flushing any residual contaminants from the surfaces of the piston 204*a*, 204*b*. In some embodiments, mixing the fluids may be undesirable. For example, if the pistons 204*a*, 204*b* reach the clean end 224 of the respective chambers 202*a*, 202*b* during the low-pressure stroke, the low-pressure dirty fluid 212 may bypass the piston 204*a*, 204*b* and mix with the low-pressure clean fluid contaminating the clean area in the clean control valve 206 with the dirty fluid.

Figure 4:
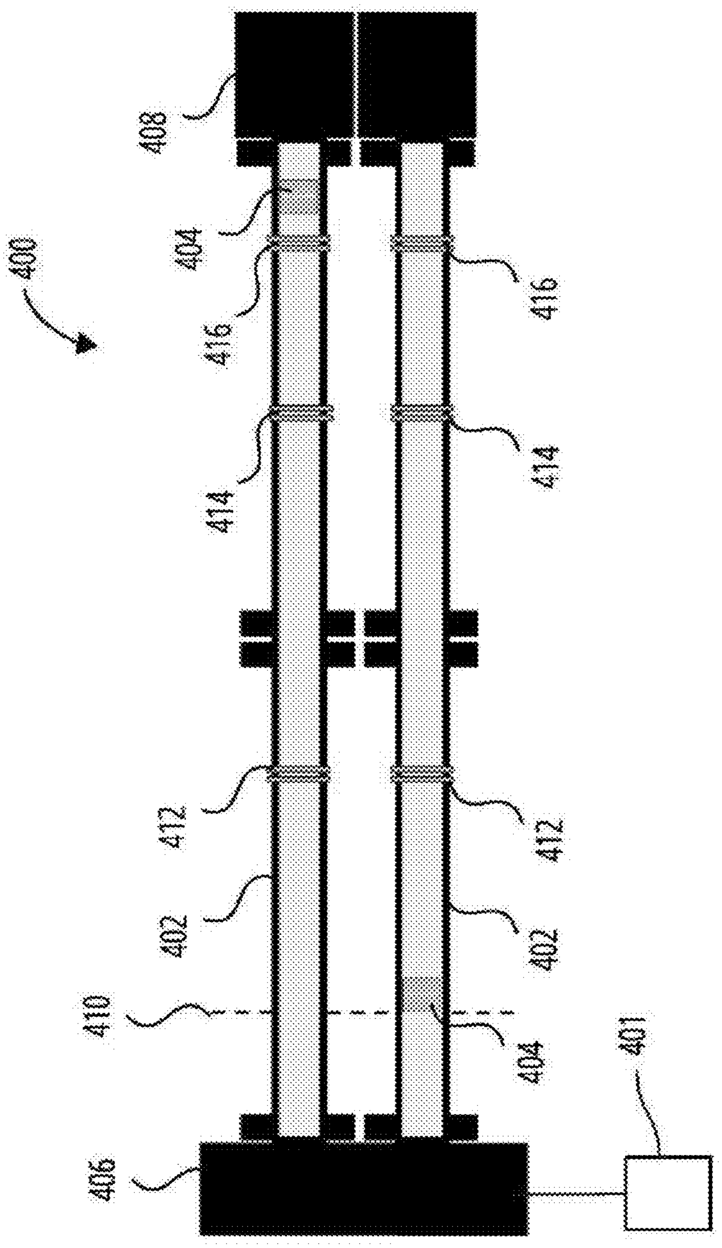
FIG. 4 is partial cross-sectional view of a fluid exchanger device according to an embodiment of the present disclosure.

FIG. 4 illustrates a pressure exchanger system 400 including a control system 401 (e.g., local and/or remote) and two chambers 402 between a clean manifold 406 and a dirty manifold 408. As depicted, the chambers 402 may be elongated hollow tubes (e.g., tubular chambers). In some embodiments, the clean manifold 406 may include a clean control valve 300 (FIGS. 2 and 3) configured to control fluid flow within the chambers 402. The chambers 402 may include one or more pistons 404 (e.g., pucks) disposed within the chambers 402. The pistons 404 may be configured to translate axially through the chambers 402 and transfer pressure properties, for example, from a high-pressure fluid flowing through the clean manifold 406 to fluid flowing in the dirty manifold 408 or transfer pressure from the fluid flowing through the dirty manifold 408 to a low-pressure fluid flowing through the clean manifold 406.

As discussed below, one or more sensors (e.g., sensors 209 (FIG. 2), the sensors discussed below) may be implemented with the control system 401 in order to operate the pressure exchanger system 400. For example, the sensors may be utilized to determine one or more of position, velocity, and/or acceleration of the pistons 700.

In some embodiments, the sensors and systems may be similar to those disclosed in U.S. patent application Ser. No. 16/678,998, titled FLUID EXCHANGE DEVICES AND RELATED CONTROLS, SYSTEMS, AND METHODS, filed Nov. 8, 2019, the disclosure of which is incorporated herein, in its entirety, by this reference.

As discussed above, contact between the pistons 404 and the clean manifold 406 may inadvertently enable dirty fluid from the dirty manifold 408 to bypass (e.g., leak by) the 404 and contaminate the clean manifold 406. Contamination of the clean manifold 406 may contaminate the clean fluid passing through the components of the fracking system, which may damage equipment and/or reduce the life span of the equipment. The pressure exchanger system 400 (e.g., via the control system 401) may be configured to substantially prevent (e.g., reduce the occurrence of) the pistons 404 from reaching the clean manifold 406.

For example, the control system 401 of the pressure exchanger system 400 may be configured to stop (e.g., cease movement of) the pistons 404 near a setback point 410, such that the pistons 404 do not contact the clean manifold 406. The pressure exchanger system 400 may include one or more sensors on a first side (e.g., low-pressure fill sensor 412) located along the chambers 402 before the setback point 410. The low-pressure fill sensor 412 may be configured to detect when the pistons 404 pass the low-pressure fill sensor 412 when heading toward the clean manifold 406.

In some embodiments, the low-pressure fill sensor 412 may be configured to detect a position and/or velocity of the pistons 404 when the pistons 404 pass the low-pressure fill sensor 412. For example, the low-pressure fill sensor 412 may be configured to detect a speed of the pistons 404 and a direction of movement of the pistons 404.

The control system 401 of the pressure exchanger system 400 may cause the clean manifold 406 comprising the clean control valve 300 (FIG. 3) to alter operation (e.g., by substantially closing and/or opening fluid flow into or out of one or more of the chambers 402) when the associated piston 404 is approaching the setback point 410, for example, as detected by the low-pressure fill sensor 412. For example, as discussed below, as the piston 404 approaches the setback point 410, the clean control valve 300 may reduce the amount of low-pressure fluid supplied through the dirty manifold 408 and/or increase the amount of high-pressure fluid supplied through the clean control valve 300.

The control system 401 of the pressure exchanger system 400 may control the clean control valve 300 based on the position and/or velocity of the pistons 404. For example, the control system 401 may calculate a time and/or distance required for the piston 404 to decelerate and stop based on the measured velocity of the piston 404. For example, a piston 404 traveling at a higher velocity may require a greater distance or a greater counterforce (e.g., applied by the clean control valve 300) to come to a stop. A piston 404 traveling at a higher velocity may travel a greater distance during the time required to close the clean control valve 300 than a piston 404 traveling at a lower velocity.

The pressure exchanger system 400 may include one or more sensors on a second side (e.g., primary high-pressure fill sensor 414 and secondary high-pressure fill sensor 416) arranged along the chambers 402 between the low-pressure fill sensor 412 and the dirty manifold 408. The primary high-pressure fill sensor 414 and the secondary high-pressure fill sensor 416 may be configured to detect when the pistons 404 pass each of the primary high-pressure fill sensor 414 and the secondary high-pressure fill sensor 416. In some embodiments, the primary high-pressure fill sensor 414 and/or the secondary high-pressure fill sensor 416 may be configured to measure at least one of a direction, velocity, or an acceleration of the pistons 404 as the pistons 404 pass the primary high-pressure fill sensor 414 and/or the secondary high-pressure fill sensor 416. The information from the primary high-pressure fill sensor 414 and the secondary high-pressure fill sensor 416 may be interpreted by the control system 401 of the pressure exchanger system 400 to determine when the pistons 404 have completed a high-pressure stroke. In some embodiments, the information from the primary high-pressure fill sensor 414 and/or the secondary high-pressure fill sensor 416 (e.g., by comparing data from the sensors 414, 416 along with a known offset between the sensors 414, 416) may be interpreted to determine if the pistons 404 are decelerating, accelerating, or maintaining velocity as the pistons 404 approach the dirty manifold 408. In some embodiments, the information from the primary high-pressure fill sensor 414 and/or the secondary high-pressure fill sensor 416 may be interpreted to determine the time required for the pistons 404 to complete the high-pressure stroke and/or may be utilized to determine one or more actions to facilitate the end of the movement of the pistons 404 and/or preparation for a return stroke.

Figure 5:
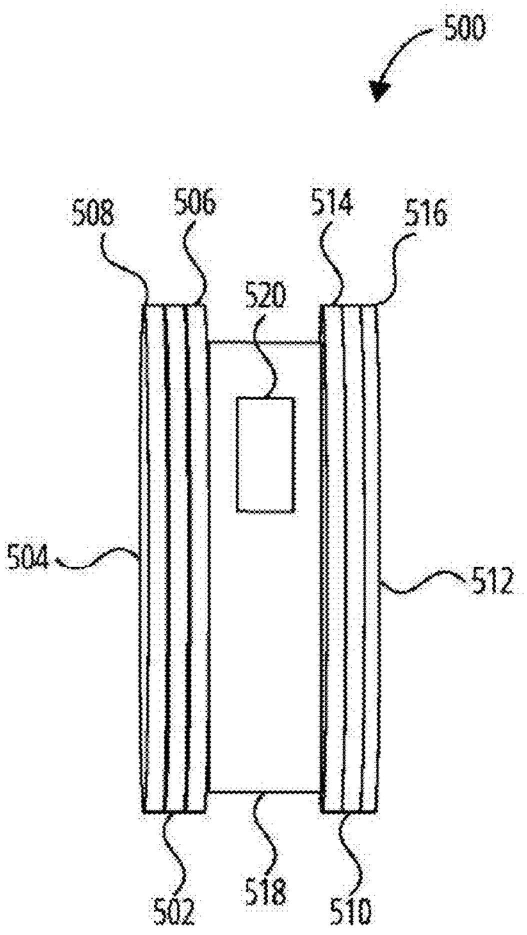
FIG. 5 is a side view of a sensor according to an embodiment of the present disclosure.

FIG. 5 illustrates an embodiment of a sensor 500 (e.g., an electromagnetic coil, inductor, etc.). The sensor 500 may serve as one or more of the low-pressure fill sensor 412, primary high-pressure fill sensor 414, and secondary high-pressure fill sensor 416 (FIG. 4). The sensor 500 may be configured to wrap around the chambers 402 of the pressure exchanger system 400 (FIG. 4). In some embodiments, the sensor 500 may be formed into the chambers 402. In some embodiments, the sensor 500 may clamp to an outer surface of the chambers 402. In some embodiments, the sensor 500 may be attached to the outer surface of the chambers 402. For example, the sensor 500 may be attached to the outer surface of the chambers 402 with mechanical fasteners, such as screws, bolts, studs, screws, rivets, clamps, etc. In some embodiments, the sensor 500 may be attached to the outer surface of the chambers 402 using adhesives, such as glue, epoxy, or other attachment processes, such as solder, brazing, welding, etc.

The sensor 500 may include one or more coils to measure one or more of position, velocity, acceleration, and/or jerk (e.g., sensed and/or determined by two, three, four or more sensor components, such as coils). For example, the sensor 500 may include a first coil 502. The first coil 502 may include a conductor wrapped several times around a first winding structure 504. The first winding structure 504 may include a first inner ridge 506 and a first outer ridge 508 configured to retain the first coil 502 on the first winding structure 504. For example, the first inner ridge 506 and the first outer ridge 508 may form a substantially annular groove around the first winding structure 504. The first coil 502 may be disposed within the annular groove around the first winding structure 504 such that the first coil 502 is axially supported on a first end by the first inner ridge 506 and on a second end by the first outer ridge 508.

The sensor 500 may further include a second coil 510. The second coil 510 may include a conductor wrapped several times around a second winding structure 512. The second winding structure 512 may include a second inner ridge 514 and a second outer ridge 516. The second inner ridge 514 and the second outer ridge 516 may form a substantially annular groove around the second winding structure 512. The second coil 510 may be disposed within the annular groove around the second winding structure 512 such that the second coil 510 is axially supported on a first end by the second inner ridge 514 and on a second end by the second outer ridge 516.

In some embodiments, the first winding structure 504 and the second winding structure 512 may be separated by an optional separation region 518. In additional embodiments, the first winding structure 504 and the second winding structure 512 may be secured to and spaced along the chambers 402 of the pressure exchanger system 400 (FIG. 4) without the separation region 518. The separation region 518 may be configured to maintain a common distance between the first winding structure 504 and the second winding structure 512. In some embodiments, the common distance between the first winding structure 504 and the second winding structure 512 may be at least about 0.5 inches (1.27 cm), such as at least about 1 inch (2.54 cm), or at least about 4 inches (10.16 cm).

In some embodiments, the conductor of the first coil 502 may be wrapped around the first winding structure 504 between about 50 times and about 300 times, such as between about 60 times and about 140 times, or between about 70 times and about 100 times. In some embodiments, the second coil 510 may be wrapped around the second winding structure 512 between about 50 times and about 300 times, such as between about 60 times and about 140 times, or between about 70 times and about 100 times. In some embodiments, the first coil 502 and the second coil 510 may include substantially the same number of wraps.

The sensor 500 may include a module 520 (e.g., positioned local or remote) configured to receive signals from each of the first coil 502 and the second coil 510. In some embodiments, the module 520 may include a processor and/or a memory device, which may be part of or separate from the control system 401 (FIG. 4). In some embodiments, the module 520 may not be implemented where such processing is carried out locally and/or remotely, for example, with the control system 401 (FIG. 4).

When the module 520 is implemented, the signals from the first coil 502 and the second coil 510 may be processed by the processor and stored in the memory of the module 520. In some embodiments, the module 520 may include a transmitter configured to transmit the signals from the first coil 502 and the second coil 510 to a computing device (e.g., the control system 401). For example, the computing device may be configured to process the signals form the first coil 502 and the second coil 510 to determine properties of the motion of a piston, such as whether the piston has passed the sensor 500, what speed the piston was traveling when it passed the sensor 500, what direction the piston was traveling when it passed the sensor 500, etc. In some embodiments, the module 520 may be configured to determine the properties of the motion of the piston and transmit the finally determined properties to the computing device. The computing device may be configured to send control signals to the clean control valve 300 based on the properties transmitted by the module 520. In some embodiments, module 520 may be configured to determine the properties of the motion of the piston and provide control instructions to the computing device and/or directly to the clean control valve 300. In some embodiments, the first coil 502 and the second coil 510 may be directly coupled to the computing device through a wired connection, such that the computing device receives the raw data directly from the first coil 502 and the second coil 510. The computing device may then process the raw data to determine the properties of the motion of the piston and/or provide control instructions to the clean control valve 300.

Figure 6:
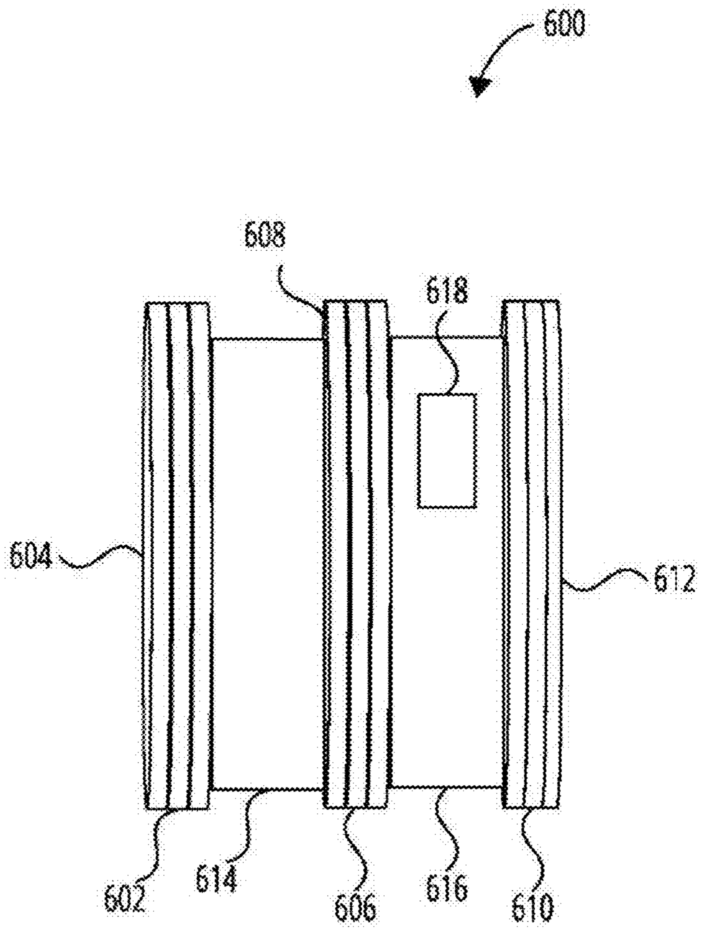
FIG. 6 is a side view of a sensor according to an embodiment of the present disclosure.

FIG. 6 illustrates an embodiments of a sensor 600. The sensor 600 may include a first coil 602 including multiple windings of a conductor wound around a first winding structure 604. The sensor 600 may also include a second coil 606 including multiple windings of a conductor wound around a second winding structure 608. The sensor 600 may further include a third coil 610 including multiple windings of a conductor wound around a third winding structure 612. The first winding structure 604 and the second winding structure 608 may be spaced (e.g., by an optional first separation region 614 configured to maintain a substantially common distance between the first winding structure 604 and the second winding structure 608). The second winding structure 608 and the third winding structure 612 may be spaced (e.g., by an optional second separation region 616 configured to maintain a substantially common distance between the second winding structure 608 and the third winding structure 612.

In some embodiments, the distance between the first winding structure 604 and the second winding structure 608 may be substantially the same as the distance between the second winding structure 608 and the third winding structure 612. In some embodiments, the distance between the first winding structure 604 and the second winding structure 608 may be greater than the distance between the second winding structure 608 and the third winding structure 612. In some embodiments, the distance between the first winding structure 604 and the second winding structure 608 may be less than the distance between the second winding structure 608 and the third winding structure 612.

The sensor 600 may include a module 618 configured to receive signals from each of the first coil 602, the second coil 606, and the third coil 610. In some embodiments, the module 618 may include a processor and/or a memory device. For example, the signals from the first coil 602, the second coil 606, and the third coil 610 may be processed by the processor and stored in the memory of the module 618. In some embodiments, the module 618 may include a transmitter configured to transmit the signals from the first coil 602, the second coil 606, and the third coil 610 to a computing device (e.g., the control system 401). For example, the computing device may be configured to process the signals form the first coil 602, the second coil 606, and the third coil 610 to determine properties of the motion of a piston 404 (FIG. 4), such as whether the piston has passed the sensor 600, what speed the piston was traveling when it passed the sensor 600, what direction the piston was traveling when it passed the sensor 600, an acceleration or deceleration of the piston (e.g., if the piston 404 is speeding up or slowing down), etc. In some embodiments, the module 618 may be configured to determine the properties of the motion of the piston and transmit the finally determined properties to the computing device. The computing device may be configured to send control signals to the clean control valve 300 based on the properties transmitted by the module 618. In some embodiments, the module 618 may be configured to determine the properties of the motion of the piston and provide control instructions to the computing device and/or directly to the clean control valve 300. In some embodiments, the first coil 602, the second coil 606, and the third coil 610 may be directly coupled to the computing device through a wired connection, such that the computing device receives the raw data directly from the first coil 602, the second coil 606, and the third coil 610. The computing device may then process the raw data to determine the properties of the motion of the piston and/or provide control instructions to the clean control valve 300.

Figure 7:
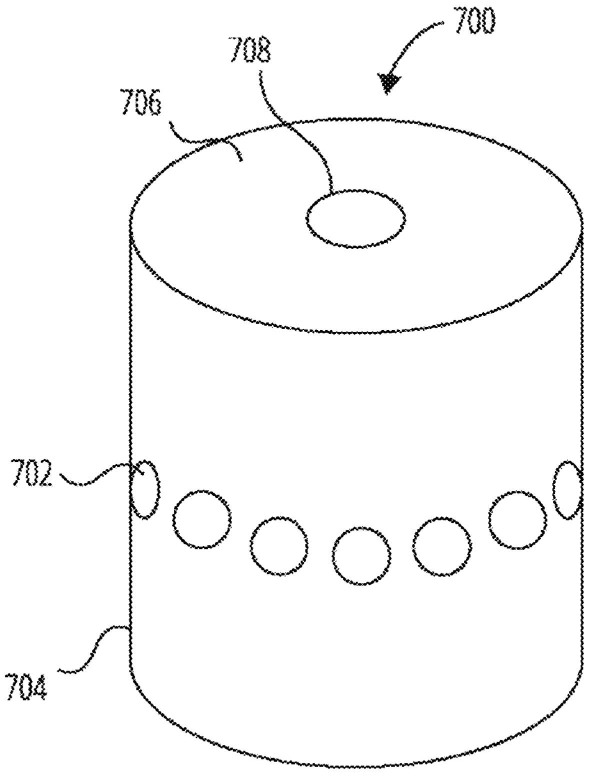
FIG. 7 is an perspective view of a piston according to an embodiment of the present disclosure.

FIG. 7 illustrates an embodiment of a piston 700. The piston 700 may be configured to operate as one or more of the pistons 204*a*, 204*b*, 404 disclosed herein, for example, with reference to FIGS. 2 and 4. The piston 700 may include a one or more magnets 702 arranged in a substantially annular ring (e.g., circumferential ring) about a cylindrical side surface 704 of the piston 700 where the magnets 702 are sensed by (e.g., trigger) the sensors discussed herein. In additional embodiments, the pistons may lack such magnets and the sensors may be configured to detect other properties of the pistons, such as, for example, the material of the piston. In additional embodiments, the detection mechanisms (e.g., electric fields, magnetic fields, for example, generated by batteries or other power sources, etc.) may be implemented.

In some embodiments, the magnets 702 may be disposed (e.g., embedded) within the side surface 704 of the piston 700. For example, the magnets 702 may be disposed such that only a face of the magnets 702 is exposed through the side surface 704 of the piston 700. The face of the magnets 702 may correspond to a pole (e.g., north pole or south pole) of each of the magnets 702 in a uniform or alternating pattern. In some embodiments, the magnets 702 may be arranged such that the same pole of each of the magnets 702 is exposed through the side surface 704 of the piston 700. For example, the north pole of each of the magnets 702 may be exposed through the side surface 704 of the piston 700. In other embodiments, the south pole of each of the magnets 702 may be exposed through the side surface 704 of the piston 700.

In some embodiments, the substantially annular ring of magnets 702 may be formed in central region of the piston 700 (e.g., at a known offset from the leading and/or trailing end of the piston 700). In some embodiments the substantially annular ring of magnets 702 may be formed near an end of the piston 700. In some embodiments, the magnets 702 may be arranged at substantially equal intervals about the side surface 704 of the piston 700 (e.g., such that an angle between a radial position of each of the magnets 702 and an adjacent magnet 702 is substantially the same).

In some embodiments, the magnets 702 may be formed into the piston 700. For example, the piston 700 may be molded around the magnets 702. In some embodiments, the magnets 702 may be disposed within the side surface 704 of the piston 700 a sufficient distance such that the magnets 702 are completely enveloped in the piston 700 (e.g., such that no surface of the magnets 702 are exposed through the side surface 704 of the piston 700). In some embodiments, the magnets 702 may be secured into blind holes drilled into the side surface 704 of the piston 700. For example, the magnets 702 may be secured using an adhesive (e.g., epoxy, glue, etc.), welding, soldering, brazing, complementary threads, fasteners, or a combination. In some embodiments, the magnets 702 may be secured within an annular groove formed in the side surface 704 of the piston 700. In some embodiments, the magnets 702 may be a single annular magnet having substantially the same outside diameter as the piston 700 arranged such that an axis of the annular magnet is substantially coaxial with an axis of the piston 700. In some embodiments, the magnets 702 may be a single disk magnet having substantially the same outside diameter as the piston 700 arranged such that an axis of the disk magnet is substantially coaxial with an axis of the piston 700.

The magnets 702 may be permanent magnets, such as Alnico magnets (Aluminum, nickel, cobalt magnets), rare earth magnets (e.g., Neodymium magnets, Samarium Cobalt magnets, etc.), ceramic magnets (e.g., hard ferrite magnets, barium magnets, strontium magnets, etc.), etc.

The piston 700 may include a port 708 extending from a first face 706 of the piston 700 to a second face (not shown) of the piston 700. The port 708 may include a check valve configured to selectively allow flow through the port 708 of the piston 700, as described in detail in U.S. patent application Ser. No. 16/678,819, titled VALVES INCLUDING ONE OR MORE FLUSHING FEATURES AND RELATED ASSEMBLIES, SYSTEMS, AND METHODS, filed Nov. 8, 2019, the disclosure of which is incorporated herein, in its entirety, by this reference.

Figure 8:
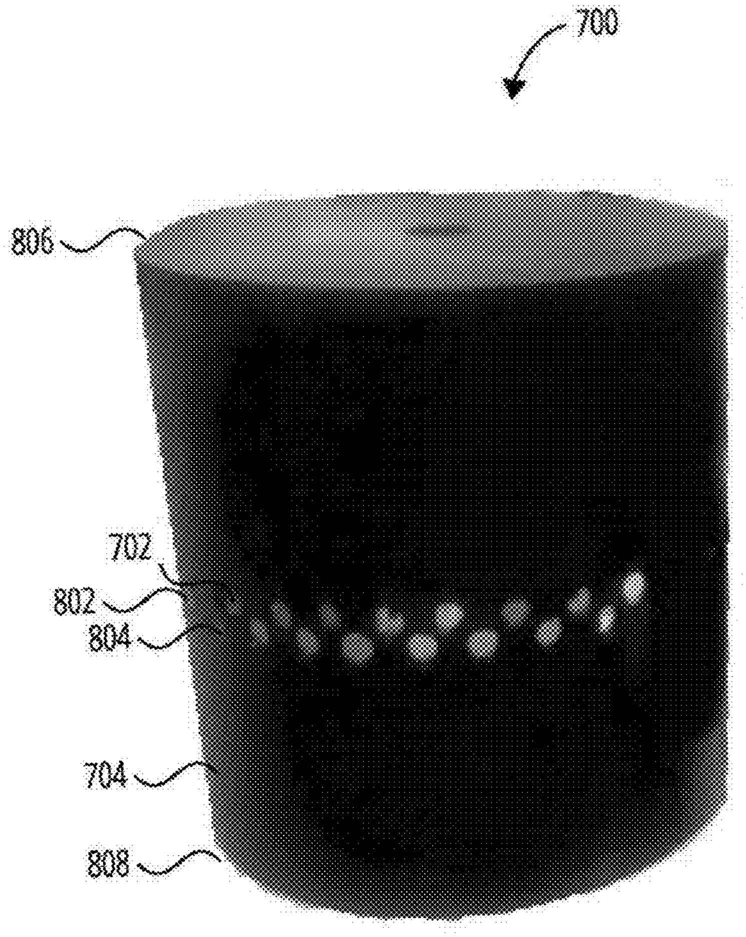
FIG. 8 is an perspective view of a piston according to an embodiment of the present disclosure.

FIG. 8 illustrates an embodiment of a piston 700. In some embodiments, the piston 700 may include multiple rows of magnets 702. As illustrated in FIG. 8, the piston 700 may include a first row 802 of magnets 702 and a second row 804 of magnets 702. In some embodiments, the first row 802 of magnets 702 and the second row 804 of magnets 702 may be adjacent to one another. For example, the first row 802 and the second row 804 of magnets 702 may be spaced an axial distance that is substantially the same as or less than the distance between adjacent magnets 702 of the same row 802, 804. In some embodiments, the magnets 702 of each of the first row 802 and the second row 804 may be substantially radially aligned. In some embodiments, the magnets 702 of each of the first row 802 and the second row 804 may be staggered, as illustrated in FIG. 8, such that a radial position of the magnets 702 of the first row 802 and/or second row 804 corresponds (e.g., is aligned with) to a space between the radial positions of the magnets 702 of the adjacent first row 802 and/or second row 804.

In some embodiments, the first row 802 of magnets 702 and the second row 804 of magnets 702 may be spaced by a substantial distance (e.g., much greater than a distance between the adjacent magnets 702 of the same row 802, 804). For example, the first row 802 of magnets 702 may be positioned near a first end 806 of the piston 700 and the second row 804 of magnets 702 may be positioned near a second end 808 of the piston 700.

In some embodiments, the first row 802 may induce a first signal in a sensor as the piston 700 passes the sensor and the second row 804 may induce a second signal in the sensor as the piston 700 passes the sensor. For example, the sensor may include a coil as discussed above. The first row 802 of magnets 702 may induce a first current in the coil as the first row 802 of magnets 702 passes the sensor. The second row 804 of magnets 702 may induce a second current in the coil as the second row 804 of magnets 702 passes the sensor. The sensor may produce a signal having an "M" wave with two peaks corresponding to the first induced current and the second induced current. As a speed of the piston 700 increases the two peaks may substantially merge into a single peak due to residual currents in the coil.

Figure 9A:
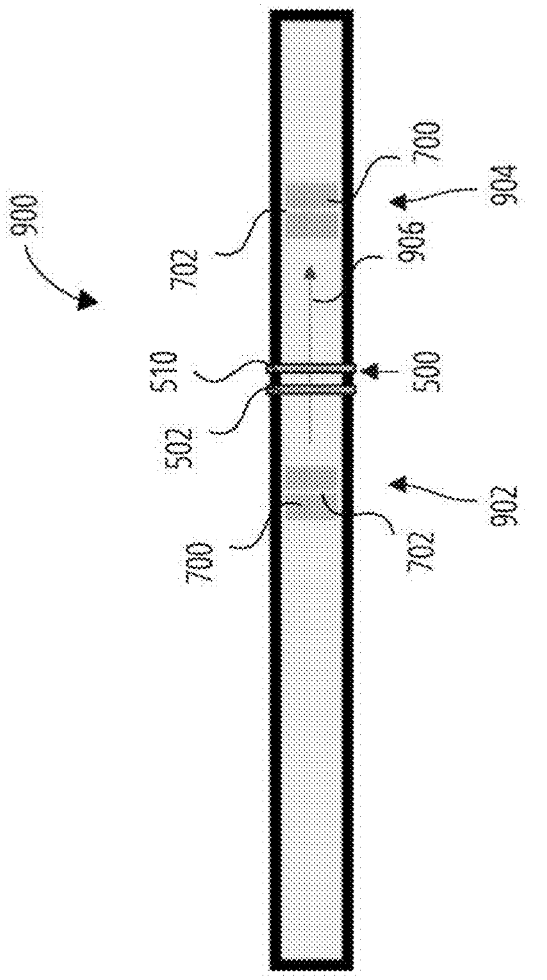
FIG. 9A is partial cross-sectional view of a portion of a fluid exchanger device according to an embodiment of the present disclosure.
Figure 9B:
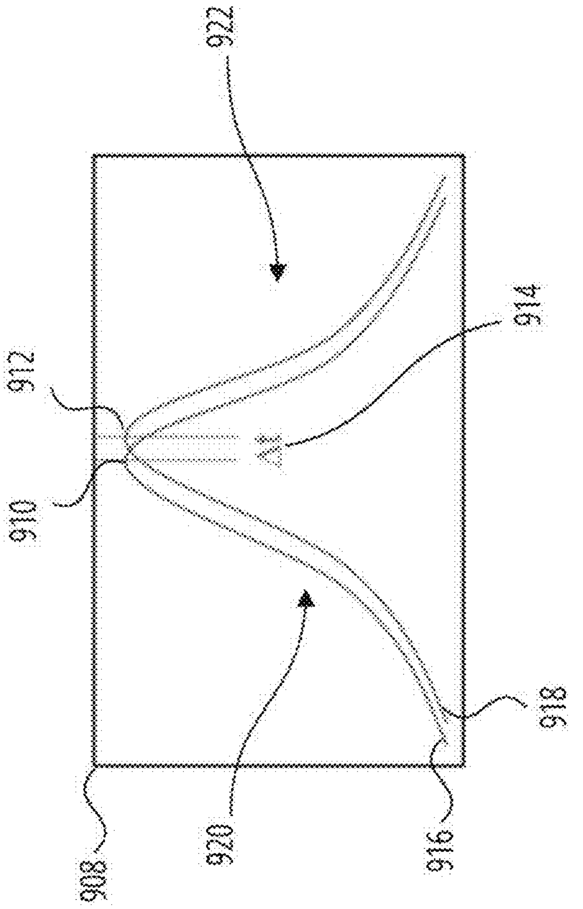
FIG. 9B is a graphical view of a signal generated by the portion of the fluid exchanger device illustrated in FIG. 9A.

FIG. 9A illustrates an embodiment of a chamber section 900 of one of the chambers 402 of the pressure exchanger system 400. The chamber section 900 may include the sensor 500 configured to measure properties of the motion of the piston 700 as the piston 700 travels from a first position 902 to a second position 904 as indicated by the arrow 906. FIG. 9B illustrates a graph 908 of a first signal 916 and a second signal 918 generated by the sensor 500 as the piston 700 passes the sensor 500. The first signal 916 may correspond to the signal generated by the first coil 502 of the sensor 500 and the second signal 918 may correspond to the signal generated by the second coil 510 of the sensor 500. In additional embodiments, a single coil may be utilized to similar effect where multiple locations on the piston 700 may be detected by the single coil (e.g., multiple elements, such as the magnets discussed above). In additional embodiments, multiple coils and multiple detection locations on the piston 700 may be utilized.

As the piston 700 passes the sensor 500, the magnets 702 may generate a signal in each of the first coil 502 and the second coil 510 of the sensor 500. For example, as the magnets 702 pass each of the first coil 502 and the second coil 510, the magnetic field or flux generated by the magnets 702 may induce an electronic response (e.g., a current) in each of the first coil 502 and the second coil 510 that changes as the position of the magnets 702 changes relative to the first coil 502 and the second coil 510. In some embodiments, the current in the first coil 502 and the second coil 510 may be directly measured. In some embodiments, the current the first coil 502 and the second coil 510 may be converted to a voltage, such as by passing the current through a resistor, and the voltage may be measured.

As the magnets 702 on the piston 700 approach the first coil 502, the response (e.g., the current and/or corresponding voltage) may rise as illustrated in the first region 920 of the graph 908. As the magnets 702 on the piston 700 pass the first coil 502, the current and/or corresponding voltage may reach a first peak 910 after which the current and/or corresponding voltage may begin to decrease as illustrated in the second region 922 of the graph 908. Similarly, as the magnets 702 on the piston 700 approach the second coil 510 the current and/or corresponding voltage may rise as illustrated in the first region 920 of the graph 908 as the piston 700 travels away from the first coil 502. The current and/or corresponding voltage may subsequently reach a second peak 912 as the magnets 702 on the piston 700 pass the second coil 510 and the current and/or corresponding voltage may then decrease as illustrated in the second region 922 of the graph 908 as the piston travels away from the second coil 510.

A time difference 914 between the first peak 910 of the first coil 502 and the second peak 912 of the second coil 510 may correspond to the time between when the magnets 702 passed through the first coil 502 and when the magnets 702 passed through the second coil 510. Thus, a speed of the piston 700 may be calculated using the distance between the first coil 502 and the second coil 510 (e.g., as defined by the spacing between coils 502, 510 or the separation region 518 (FIG. 5) of the sensor 500) and the time difference 914 between the first peak 910 and the second peak 912 (e.g., velocity equaling the distance divided by the change in time).

The direction of the piston 700 may be determined by which of the first coil 502 and the second coil 510 recorded the first peak 910 and the second peak 912 respectively. For example, as illustrated in FIGS. 9A and 9B, the piston 700 first passed the first coil 502, which in turn recorded the first peak 910, and next passed through the second coil 510, which recorded the second peak 912. Had the piston 700 passed through the sensor 500 in the opposite direction, the second coil 510 would have recorded the first peak 910 and the first coil 502 would have recorded the second peak 912. Therefore, a direction of the piston 700 may be determined by determining which of the respective first coil 502 and second coil 510 recorded the first peak 910 and the second peak 912.

Figure 10A:
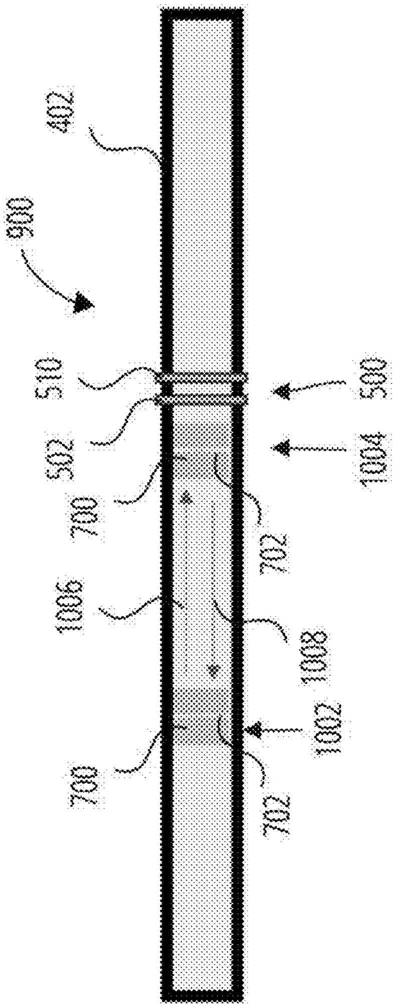
FIG. 10A is partial cross-sectional view of a portion of a fluid exchanger device according to an embodiment of the present disclosure.
Figure 10B:
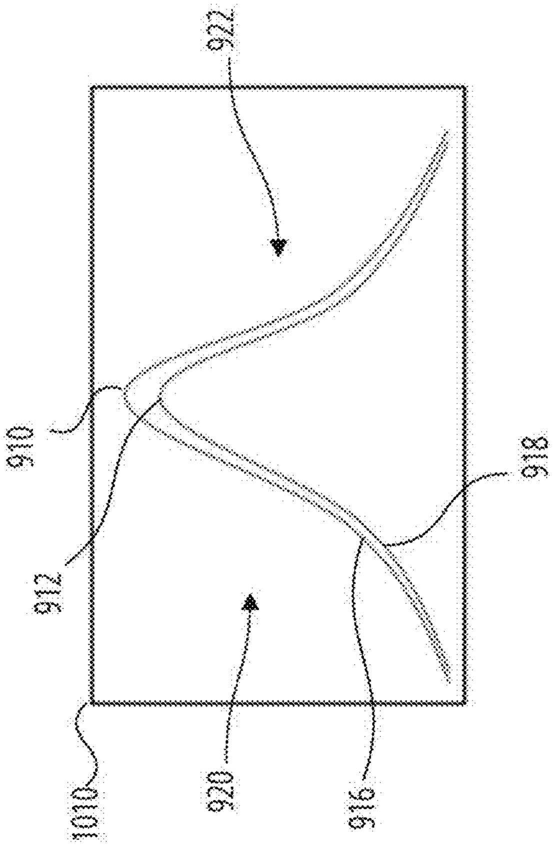
FIG. 10B is a graphical view of a signal generated by the portion of the fluid exchanger device illustrated in FIG. 10A.

FIG. 10A illustrates an embodiment of a chamber section 900 of one of the chambers 402 of the pressure exchanger system 400. The chamber section 900 may include the sensor 500 configured to measure properties of the motion of the piston 700 as the piston 700 travels from a first position 1002 to a second position 1004 as indicated by the arrow 1006 and reverses direction traveling back to the first position 1002 as indicated by the arrow 1008. FIG. 10B illustrates a graph 1010 of a first signal 916 and a second signal 918 generated by the sensor 500 as the piston 700 approaches the sensor 500. The first signal 916 may correspond to the signal generated by the first coil 502 of the sensor 500 and the second signal 918 may correspond to the signal generated by the second coil 510 of the sensor 500.

The signals generated by the sensor 500 may be interpreted to determine if the piston 700 passes through the sensor 500 (e.g., entirely through, partially through) or if the piston 700 stops short of the sensor 500 and reverses direction before passing through the sensor 500. As the magnets 702 on the piston 700 approach the first coil 502, the current and/or corresponding voltage produced by the first coil 502 may rise in the first region 920 of the graph 908. The current and/or corresponding voltage may reach a first peak 910 before decreasing in the second region 922 of the graph 1010 indicating that the magnets 702 are traveling away from the first coil 502. Similarly, as the magnets 702 on the piston 700 approach the second coil 510, the current and/or corresponding voltage produced by the second coil 510 may rise in the first region 920 of the graph 908. The current and/or corresponding voltage may reach a second peak 912 before decreasing in the second region 922 of the graph 1010 indicating that the magnets 702 are traveling away from the second coil 510.

As illustrated in the graph 1010 the first peak 910 and the second peak 912 occur at substantially the same time with the second peak 912 being substantially smaller (e.g., lower amperage or voltage) than the first peak 910. When the first peak 910 and the second peak 912 occur at substantially the same time, it may indicate that the magnets 702 on the piston 700 were at a point near to the first coil 502 and the second coil 510 at substantially the same time. However, the lack of an appreciable time lapse between peaks 910, 912 detected the first coil 502 and the second coil 510 indicates that the magnets 702 and the piston 700 did not pass through both of the first coil 502 and the second coil 510.

In additional embodiments, the measurements may be compared to determine if the piston 700 has passed. For example a measurement from each coil 502, 510 (e.g., the peaks 910, 912 or the maximum voltage levels) may be compared to determine if the piston 700 has passed. If the peaks 910, 912 are within a selected amount, such as, for example, greater than 75% (e.g., 80%, 90%, 95%, or greater) then the comparison may be utilized to determine that the piston 700 has passed.

Figure 11:
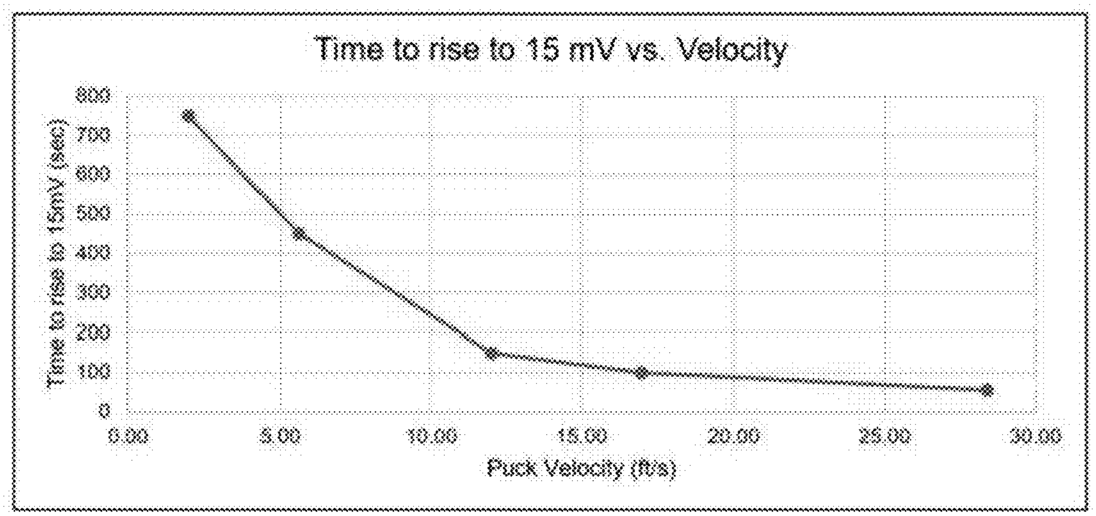
FIG. 11 is a graphical view of a relationship between a rate of change of signal voltage and piston speed according to an embodiment of the present disclosure.

FIG. 11 illustrates a graph 1100 illustrating a relationship (e.g., calculated and/or empirically determined) between the rate at which the voltage corresponding to the current generated in the first coil 502 and the second coil 510 rises in millivolts (mV) per second to a speed of the piston 700 (e.g., puck) in feet per second (ft/s). Such data may be utilized in analyzing and/or predicting the amount of voltage rise over time or other property that is expected and/or indicated by a certain velocity of the piston.

As illustrated in the graph 1100, and referring also to FIGS. 4, 7, 9A, and 9B, the rate of the rise in voltage may be correlated to a speed of the piston 700. As the speed of the piston 700 increases, the amount of time and/or level of counteracting force may increase. For example, the time needed to actuate the clean control valve 300 and slow the piston 700 to a stop may increase in order to prevent the piston 700 from contacting the clean manifold 406.

The speed of the piston 700 may be estimated from a detected slope of one or more of the first signal 916 and the second signal 918 from the respective first coil 502 and the second coil 510. Such a slope may be compared to the known valves of the rate of the rise to a selected voltage (e.g., as depicted, 15 mV) of the first signal 916 and the second signal 918. Using the known values of time to rise for a selected piston 700 velocity, the velocity may be approximated based on the observed slope in the current stroke before the piston 700 completely passes through the sensor 500. For example, the velocity may be calculated before the first peak 910 is reached, such as at about 50% of the first peak 910, or at about 75% of the first peak 910. Calculating the speed of the piston 700 before the first peak 910 may enable the computing device (e.g., control system 401) and/or module 520 to generate a command to the clean control valve 300 with sufficient time to successfully decrease the speed and/or stop the piston 700, for example, by the setback point 410.

Figure 12:
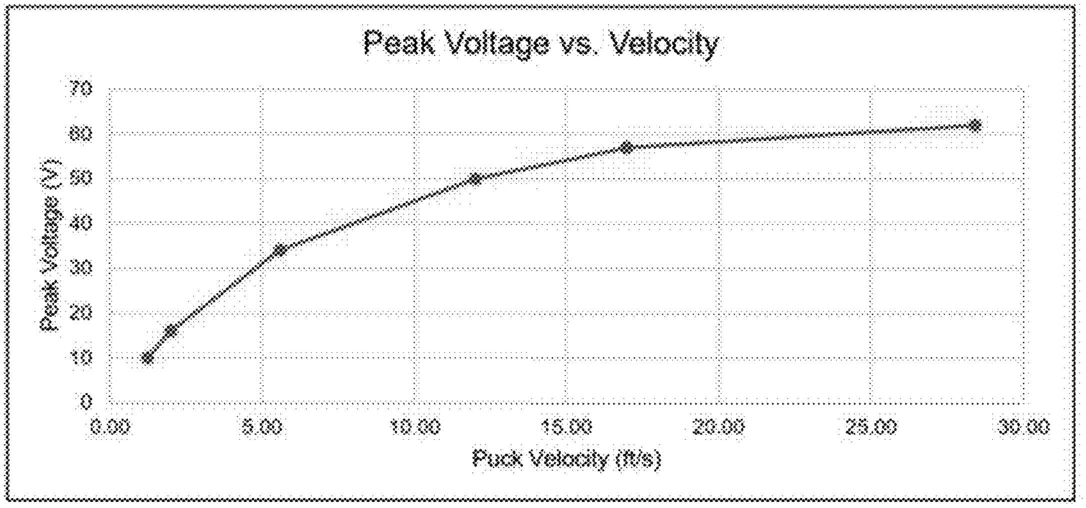
FIG. 12 is a graphical view of a relationship between signal voltage and piston speed according to an embodiment of the present disclosure.

FIG. 12 illustrates a graph 1200 illustrating a relationship between the speed of the piston 700 (e.g., puck) and the peak voltage (e.g., calculated and/or empirically determined) corresponding to the current generated in the first coil 502 and the second coil 510, as illustrated respectively by the first peak 910 and the second peak 912. As illustrated in the graph 1200, and referring also to FIGS. 4, 7, 9A, and 9B, the expected or predetermined peak voltage (e.g., the magnitude of the voltage or other property) may be correlated to a speed of the piston 700. As described above, as the speed of the piston 700 increases, the amount of time and/or level of counteracting force may increase. For example, the time needed to actuate the clean control valve 300 and slow the piston 700 to a stop may increase in order to prevent the piston 700 from contacting the clean manifold 406.

The speed of the piston 700 may be estimated by one or more of the first peak 910 and the second peak 912. Estimating the speed of the piston 700 from the first peak 910 or the second peak 912 may enable a calculation and/or instructions to be completed before the one or more of entire curves illustrated in graph 908 develop. For example, once a peak voltage is detected from one of the coils 502, 510, the approximate velocity of the piston 700 may be determined (e.g., prior to knowing the time shift between the peaks 910, 912). Thus, instructions may be provided to the clean control valve 300 at an earlier time, which may enable the computing device and/or module 520 to generate a command to the clean control valve 300 with sufficient time to successfully stop the piston 700 by the setback point 410.

Figure 13:
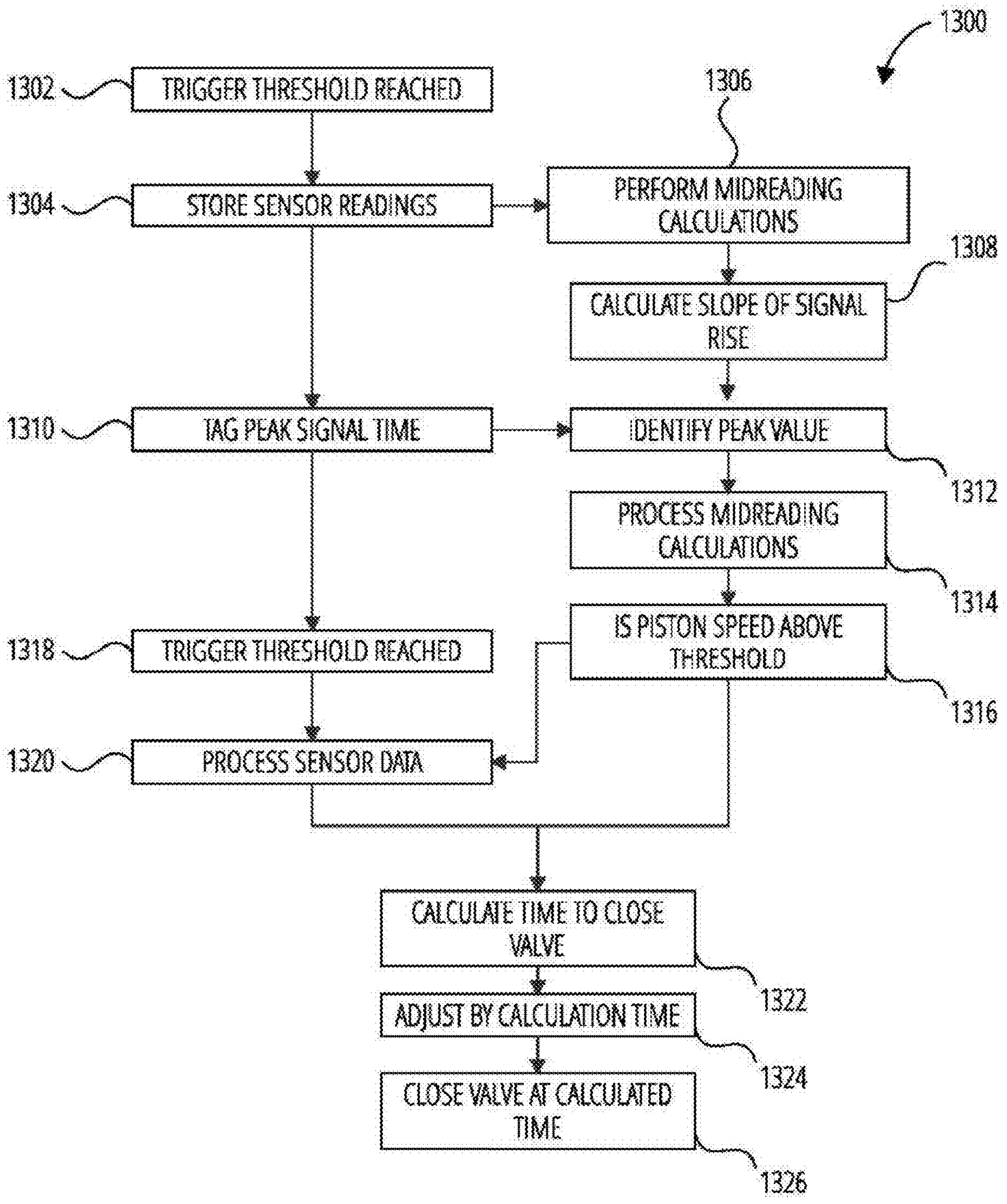
FIG. 13 is a flow diagram of a control process for a fluid exchanger device according to an embodiment of the present disclosure.

FIG. 13 illustrates a method of controlling a pressure exchanger 1300. Referring also to FIGS. 4 through 12. As the piston 700 travels along the chamber section 900 approaching the sensor 500, the magnets 702 may begin to induce a current in the first coil 502 and the second coil 510 resulting in a first signal 916 and a second signal 918. For simplicity, only the signal of one of the first coil 502 and the second coil 510 is addressed unless a comparison between the first signal 916 of the first coil 502 and the second signal 918 of the second coil 510 is discussed.

As the signal value rises, the signal value may reach a threshold value, as illustrated in act 1302. For example, as the piston 700 travels within the chamber section 900, the signal value may be substantially constant until the piston 700 comes within a threshold distance from the sensor 500. Once the piston 700 crosses the threshold distance, the signal value may begin to rise. The rise in the signal value may be relatively slow (e.g., a low rise) for a first distance and then begin to increase at a greater rate as the piston 700 nears the sensor 500. In some embodiments, the greater or relatively more constant rate of increase in the signal value may be the region of the signal that lends more valuable information regarding the properties of the motion of the piston 700. For example, the threshold signal value may enable a processor to identify the region of the signal where the signal value is changing at a higher rate. In some embodiments, the threshold signal value may be between about 1 millivolt (mV) and about 7 mV, such as between about 2 mV and about 6 mV, or about 5 mV.

Once the threshold signal value is reached, the resulting signals may begin or continue to be stored and/or analyzed in a memory device in act 1304. For example, signals under the threshold value may be disregarded as noise. The memory device may be located in the sensor 500, such as in module 520 and/or in the control system 401. In some embodiments, the memory device may be a separate component directly coupled to the sensor 500. In some embodiments, the memory device may a component of a computing device (e.g., the control system 401) coupled to the sensor through a network connection, such as a server, switch, cloud, wireless, network cables, etc.

As the signal value increases past the threshold value, a processor may optionally perform calculations as the signal is being recorded in act 1306. In some embodiments, the processor may be part of the module 520 and/or control system 401. The processor may optionally calculate a slope of the increase in the signal value, such as an average slope, an instantaneous slope (e.g., slope between two adjacent data points in the signal), etc. in act 1308, if an early determination of the velocity of the piston 700 is required or desirable. As discussed above in FIG. 11, the slope of the increase in the signal value, such as voltage or current, may be correlated to a speed of the piston 700.

As the signal value continues to increase, it may reach a peak value. The peak value may be identified when the signal value begins to decrease. The time when the peak value occurs may be tagged as illustrated in act 1310. When the peak value is identified the peak value may also be recorded in act 1312. As discussed above, the peak valve may be utilized to estimate velocity of the piston 700.

If early determination of piston 700 velocity is implemented, after one or both of the slope and the peak value are identified, the processor may process the slope and/or the peak value in act 1314. The processor may determine a speed of the piston 700 based on one or more of the slope of the signal and the peak value of the signal. For example, as discussed above, the slope of the signal and/or the peak value of the signal may be correlated to a velocity of the piston 700. Therefore, the speed of the piston 700 may be estimated using the slope of the signal and/or the peak value of the signal.

Where implemented, the estimated speed of the piston 700 may be compared against a threshold speed in act 1316. For example, as discussed above, if the piston 700 is traveling at a high rate of speed, the processor may need to send a command to the clean control valve 300 earlier to avoid a collision between the piston 700 and the clean manifold 406. If the estimated speed of the piston 700 is greater than the threshold speed, the estimated speed may be used to calculate the time when the clean control valve 300 should be closed in act 1322. The threshold speed may be between about 7 and 12 ft/s, about 15 ft/s (4.572 m/s) and about 25 ft/s (7.62 m/s), such as between about 17 ft/s (5.182 m/s) and about 22 ft/s (6.706 m/s), or between about 17 ft/s (5.182 m/s) and about 20 ft/s (6.096 m/s).

As discussed above, in some embodiments, the slope of the signal may be evaluated before the signal reaches the peak value. Thus, the speed may be estimated based on the slope of the signal before the signal reaches the peak value. This may enable the processor to determine if early actions should be taken by comparing the estimated speed to the threshold speed before the signal has reached the peak value. In some embodiments, the speed estimated by the slope of the signal may be compared to a separate threshold speed. For example, the speed estimated by the slope of the signal may be compared against a higher threshold speed, such as between about 15 ft/s (4.572 m/s) and about 30 ft/s (9.144 m/s), or between about 22 ft/s (6.706 m/s) and about 25 ft/s (7.62 m/s), 30 ft/s (9.144 m/s). If the estimated speed of the piston 700 is greater than the higher threshold speed, the speed estimated by the slope of the signal may be used to calculate the time when the clean control valve 300 should be closed in act 1322 (e.g., immediately, for example, if a negative wait time is calculated).

Where implemented, the speed of peak value of the signal may be evaluated by the processor once the peak values are identified. In some embodiments, such an estimation may be utilized as a confirmation or in an average calculation, as discussed below, of the speed estimated by the slope of the signal is less than the higher threshold speed. In additional embodiments, only the peak value estimation of velocity may be implemented.

Once the speed is estimated based on the peak value, the speed estimated by the peak value may be compared to the lower threshold speed. If the speed estimated by the peak value is greater than the lower threshold speed, the speed estimated by the peak value may be used to calculate the time when the clean control valve 300 should be closed in act 1322. In some embodiments, the speed estimated by the peak value may be averaged with the speed estimated by the slope of the signal and the average estimated speed may be compared to the lower threshold speed. In some embodiments, the average speed may be used to calculate the time when the clean control valve 300 should be closed in act 1322.

If the speed estimated by the slope of the signal and/or the speed estimated by the peak value are lower than the threshold speed, the processor may wait for the complete set of data from the sensor 500 to be processed.

In some embodiments, the processor compare a measurement (e.g., velocity measurement) with a threshold measurement (e.g., a low velocity threshold) to determine whether to utilize the velocity measure or to wait and preform another measurement (e.g., to ensure the slope being utilized is a reliable measurement that is, for example, sufficiently separate or free from substantial interference from the noise floor). For example, at a first reading (e.g., at a first selected level), a first velocity calculation may be made. If the first velocity is less than a low velocity threshold, the wait time calculation may be performed or the system may wait for a detected signal peak (e.g., as such a peak may be close in time due to the relative low velocity). If the first velocity is greater than a low velocity threshold, the system may a selected amount of time and/or until a second selected level is detected (e.g., a voltage that is closer to or even at a expected peak level), another reading may be taken and a second (e.g., assumedly higher) velocity may be calculated. The wait time calculation or other actions may then be performed with the second higher velocity.

Where such velocity predictors are not implemented, the process may skip such prediction calculations, for example, by remaining solely in the left hand column depicted in FIG. 13.

As the piston 700 moves away from the sensor 500, the signal value may decrease until the signal value reaches a decreasing threshold value, as illustrated in act 1318. In some embodiments, the threshold value may be substantially the same as the first threshold value. In some embodiments, the threshold value may be different than the first threshold value. For example, the second threshold value may be greater than the first threshold value to account for residual current in the first coil 502 and/or the second coil 510.

After the signal value falls below the threshold value, the complete set of data for the signal values representative of the properties of the motion of the piston 700 may be processed by the processor in act 1320. In some embodiments, other factors may indicated that the piston is moving away from the sensor 500 (e.g., a measurement of time, detection of a decreasing slope in one or more of the coils, etc.).

During the processing act, the time when the peak value occurred may be evaluated against the time of the peak value in an adjacent coil (e.g., as discussed above). For example, the time of the first peak 910 may be compared to the time of the second peak 912. A time difference may be identified between the time of the first peak 910 and the second peak 912. The time difference coupled with the known distance between the first coil 502 and the second coil 510 may be used to calculate the speed of the piston 700.

As discussed above, if the time difference is sufficiently small (e.g., below a threshold value), such that the first peak 910 and the second peak 912 occur at substantially the same time, the processor may identify that the piston 700 did not pass through the sensor 500. The processor may further verify the finding that the piston 700 did not pass through the sensor 500 by comparing the peak signal values of the first peak 910 and the second peak 912 to determine if the second peak 912 is less than the first peak 910. In some embodiments, corrective action may be taken (e.g., with the valve 300) to correct travel of a piston 700 that was intended to pass one of the sensors 500.

In some embodiments, an optional third coil 610 may provide a third signal having a third peak. The third peak may be compared to the first peak 910 and the second peak 912. For example, the velocity between the first coil 602 and the second coil 606 may be compared to a velocity calculated between the second coil 606 and the third coil 610. A difference between the calculated velocities may be used to calculate an acceleration (e.g., rate of change in velocity) of the piston 700 as the piston 700 passed through the sensor 500.

If the processor has not already calculated when to close the clean control valve 300 based on the estimated speeds from the mid-reading calculations, the processor may calculate when to close the clean control valve 300 based on the velocity calculated from the complete data sets of the sensor 500 in act 1322. In some embodiments, such a calculation may be compared with the mid-reading calculations.

After the time to close the clean control valve 300 is calculated in act 1322, the time may be adjusted by the time required to make the calculation in act 1324. For example, the processor may identify the time when the calculation began and the time when the time was calculated and adjust (e.g., subtract) the calculated time by the amount of time spent by the processor in completing the calculation. In some embodiments, the calculation time may be between about 10 milliseconds (ms) and about 70 ms, such as between about 20 ms and about 50 ms.

The processor may wait (e.g., allow a calculated dwell time to pass) until the calculated time to close has passed and then send instructions to the clean control valve 300 to close in act 1326 (e.g., also taking into account the actual time required to move the valve 300). The instructions may be provided to the clean control valve 300 such that the clean control valve 300 may close with sufficient time to stop the piston 700 at or near the setback point 410. The setback point 410 may be defined with sufficient space between the setback point 410 and the clean manifold 406 that the piston 700 may overshoot the setback point 410 by a small amount, equivalent to a margin of error, without colliding with the clean manifold 406.

As discussed above, the pressure exchanger system 400 may include more than one chamber. As the pistons travel within the chambers the pistons may become out of balance (e.g., the pistons may not reach the opposite ends of the respective chambers at the same time). As the pistons become out of balance, the efficiency of the pressure exchanger system 400 may be reduced and/or damage to the system may occur. Thus, correcting imbalance in the pressure exchanger system 400 may enable the efficiency of the system to increase or at least remain at acceptable or optimum levels.

Figure 14:
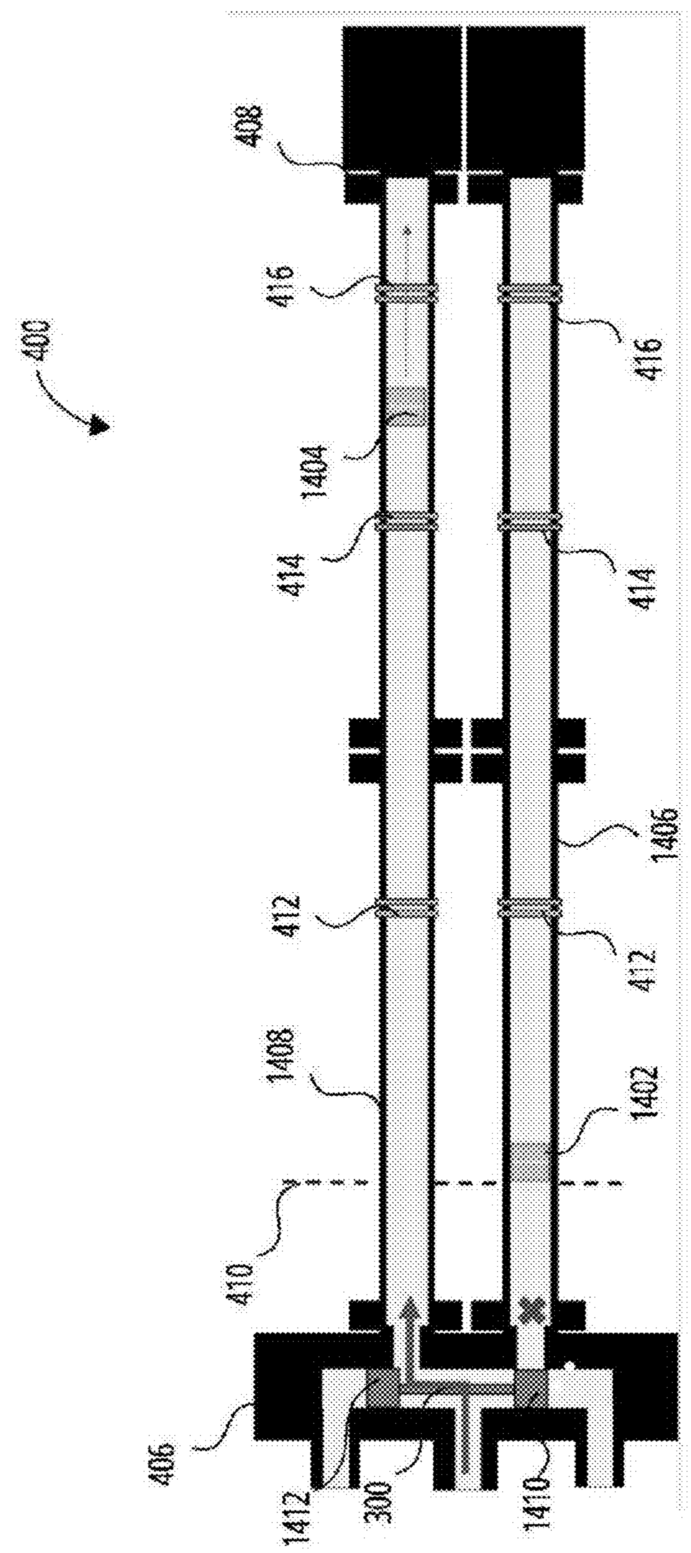
FIG. 14 is partial cross-sectional view of a fluid exchanger device according to an embodiment of the present disclosure.

FIG. 14 illustrates a pressure exchanger system 400 having a first piston 1402 in a first chamber 1406 and a second piston 1404 in a second chamber 1408. As noted above, any of the sensor detection events may include the detection and/or determination of one or more of position, velocity, and/or acceleration of the pistons 1402, 1404.

As discussed above, it may be advantageous in some embodiments that the second piston 1404 arrive at the dirty manifold 408 at substantially the same time as the first piston 1402 arrives at the setback point 410 (e.g., balancing the pistons 1402, 1404). In some conditions, the high-pressure clean fluid flowing into the clean manifold 406 may be insufficient to move the second piston 1404 to a desired positioned proximate the dirty manifold 408 (e.g., adjacent or in contact with the end at the dirty manifold) as the first piston 1402 moves toward the clean manifold 406 under the influence of the dirty fluid. Such a condition may be referred to as a lean condition. FIG. 14, illustrates a lean condition where the first piston 1402 is positioned in the setback point 410 and the second piston 1404 has not yet arrived at the dirty manifold 408.

In a lean condition, control of the pressure exchanger system 400 may be adjusted to maintain balance between the first chamber 1406 and the second chamber 1408. For example, the pressure exchanger system 400 may evaluate readings from the sensors in the pressure exchanger system 400 to determine the position of each of the respective pistons 1402, 1404. For example, as described above, the low-pressure fill sensor 412 may detect and/or determine a position and/or velocity of the first piston 1402 as the first piston 1402 approaches the clean manifold 406. The clean control valve 300 may be controlled accordingly to substantially stop the first piston 1402 at or near the setback point 410 to prevent the first piston 1402 from colliding with the clean manifold 406. The second piston 1404 may be traveling the opposite direction in the second chamber 1408. The primary high-pressure fill sensor 414 may report when the second piston 1404 passes the primary high-pressure fill sensor 414 and the secondary high-pressure fill sensor 416 may similarly report when the second piston 1404 passes the secondary high-pressure fill sensor 416. If the clean control valve 300 is controlled to close the first chamber 1406 stopping the first piston 1402 at the setback point 410 before one or more of the primary high-pressure fill sensor 414 and the secondary high-pressure fill sensor 416 have reported that the second piston 1404 has passed, the control of the clean control valve 300 may be altered to enable the high-pressure clean fluid to continue moving the second piston 1404 to the dirty manifold 408.

In some embodiments, a first stopper 1410 and a second stopper 1412 of the clean control valve 300 may be positioned such that the first stopper 1410 may substantially block the first chamber 1406 while the second stopper 1412 enables high-pressure clean fluid to continue to pass through the clean manifold 406 into the second chamber 1408. Accordingly, the movement of the clean control valve 300 may be adjusted to enable the clean control valve 300 to dwell in a position where the flow out of the first chamber 1406 is substantially stopped while flow into the second chamber 1408 continues.

In some embodiments, pressure exchanger system 400 may be configured to enable the clean control valve 300 to dwell in a position that holds the first chamber 1406 substantially closed while enabling flow into the second chamber 1408 until the second piston 1404 passes the secondary high-pressure fill sensor 416 as indicated by a signal processed from the secondary high-pressure fill sensor 416. In some embodiments, the pressure exchanger system 400 may determine if the second piston 1404 passed the secondary high-pressure fill sensor 416 during an already finished stroke. The pressure exchanger system 400 may then adjust a dwell time of the clean control valve 300 such that the high-pressure clean fluid flows into the second chamber 1408 for a longer period of time on the following stroke of the second piston 1404.

In some embodiments, the clean control valve 300 may dwell in a position that holds the first chamber 1406 and the second chamber 1408 at least partially open (e.g., open to at least the one inlet (e.g., a high pressure inlet) in order to drive both the pistons 1402, 1404 toward the dirty manifold 408.

Figure 15:
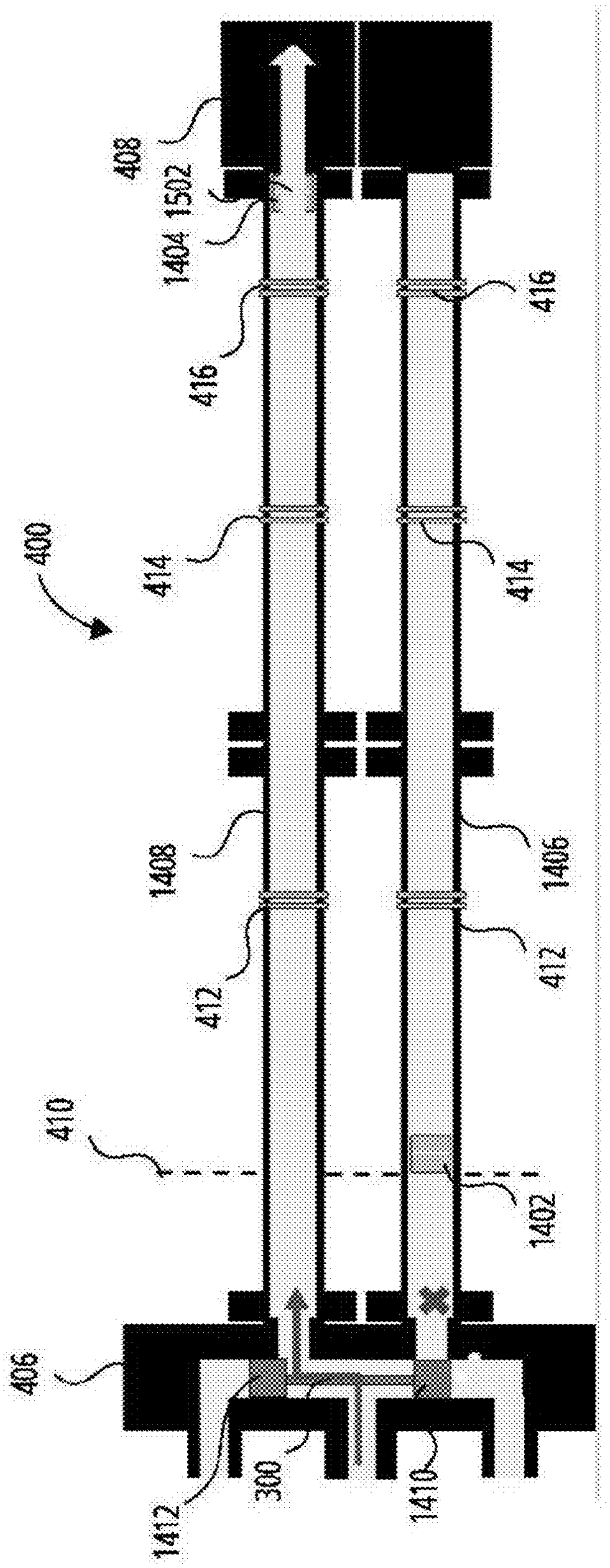
FIG. 15 is partial cross-sectional view of a fluid exchanger device according to an embodiment of the present disclosure.

In some conditions, the high-pressure clean fluid flowing into the clean manifold 406 may cause the second piston 1404 to move to an intended positon proximate the dirty manifold 408 before the first piston 1402 moves to an intended positon proximate the clean manifold 406 under the influence of the dirty fluid. Such a condition may be referred to as a rich condition. FIG. 15, illustrates a rich condition where the second piston 1404 arrives at the dirty manifold 408 before the first piston 1402 stops at or near the setback point 410.

Such a condition may be utilized to flush one of the chamber 1406, 1408 and/or to hold piston 1404 while piston 1402 reaches a desired position (e.g., the setback point 410)/

Each of the first piston 1402 and the second piston 1404 may include a check valve 1502. The check valve 1502 may be configured to enable the high-pressure clean fluid to pass through the first piston 1402 or second piston 1404 when the first piston 1402 or the second piston 1404 reaches the dirty manifold 408. For example, as illustrated in FIG. 15, the dirty manifold 408 may stop the movement of the second piston 1404, such as through contact with the dirty manifold 408 or another type of stop such as a ridge, bumper, spring, etc. Once the second piston 1404 stops the pressure building up on the opposite side of the second piston 1404 from the high-pressure clean fluid may be released through the check valve 1502 enabling the high-pressure clean fluid to flow through the second piston 1404 into the dirty manifold 408. The check valve 1502 may be configured similar to the check valves described in U.S. patent application Ser. No. 16/678,819, titled VALVES INCLUDING ONE OR MORE FLUSHING FEATURES AND RELATED ASSEMBLIES, SYSTEMS, AND METHODS, filed Nov. 8, 2019, the disclosure of which is incorporated in its entirety by reference.

In some embodiments, a rich condition may be desirable to clear debris from the first piston 1402 or the second piston 1404. For example, the pressure exchanger system 400 may monitor the primary high-pressure fill sensor 414 and the secondary high-pressure fill sensor 416 to determine whether the second piston 1404 passed the primary high-pressure fill sensor 414 and/or the secondary high-pressure fill sensor 416. As depicted, the valve 300 may cease flow from the chamber 1406 (e.g., stopper 1410) in order to hold piston 1402 substantially stationary or proximate a desired location while the flushing operation is performed.

In some embodiments, a velocity of the second piston 1404 may be calculated by the pressure exchanger system 400 at one or both of the primary high-pressure fill sensor 414 and the secondary high-pressure fill sensor 416. In some embodiments, an acceleration of the second piston 1404 may be calculated by comparing velocity calculations at the primary high-pressure fill sensor 414 and the secondary high-pressure fill sensor 416. In some embodiments, one or more of the primary high-pressure fill sensor 414 and the secondary high-pressure fill sensor 416 may be configured to directly detect an acceleration of the second piston 1404 as the second piston 1404 passes the primary high-pressure fill sensor 414 and/or secondary high-pressure fill sensor 416. For example, one or more of the primary high-pressure fill sensor 414 and the secondary high-pressure fill sensor 416 may include a third coil 610 (FIG. 6). As discussed above, the third coil 610 may enable the primary high-pressure fill sensor 414 or the secondary high-pressure fill sensor 416 to detect an acceleration of the second piston 1404.

The pressure exchanger system 400 may adjust the control of the clean control valve 300 such that the second piston 1404 is traveling at a desired velocity and/or accelerating at a desired rate as the second piston 1404 passes the secondary high-pressure fill sensor 416, such that the second piston 1404 will reach the dirty manifold 408 before the clean control valve 300 stops the flow of high-pressure clean fluid into the second chamber 1408.

Figure 16:
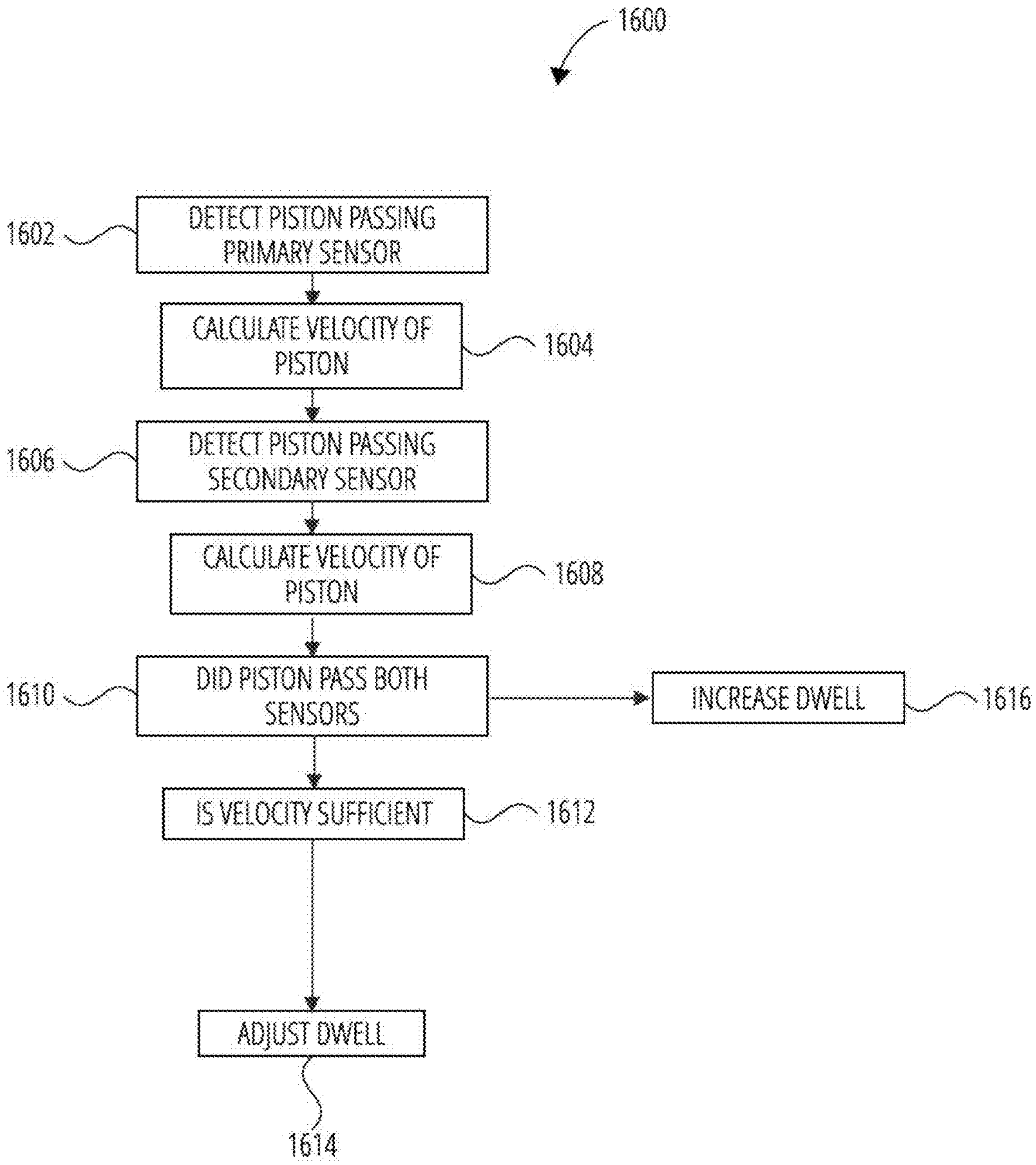
FIG. 16 is a flow diagram of a control process for an embodiment of a fluid exchanger device according to an embodiment of the present disclosure.

FIG. 16 illustrates a method of balancing a pressure exchanger system 1600. Also referring to FIG. 14 and FIG.

15, in some embodiments, the pressure exchanger system 400 may substantially balance the first chamber 1406 and the second chamber 1408 by monitoring the primary high-pressure fill sensor 414 and the secondary high-pressure fill sensor 416 independent of the low-pressure fill sensor 412.

The low-pressure fill sensor 412 may be used to stop movement of the pistons 1402, 1404 before the pistons 1402, 1404 contact the clean manifold as described above. However, the balance between the first chamber 1406 and the second chamber 1408 may be substantially controlled by the primary high-pressure fill sensor 414 and the secondary high-pressure fill sensor 416. In some embodiments, data from the low-pressure fill sensor 412 may be utilized. For example, in each determination list below, the position of the pistons 1402, 1404 at the clean end may be verified (e.g., by data from the low-pressure fill sensor 412) to ensure that the pistons 1402, 1404 do not contact the clean end (e.g., the clean manifold 406).

The pressure exchanger system 400 may determine if the second piston 1404 has passed the primary high-pressure fill sensor 414 in act 1602. The primary high-pressure fill sensor 414 may include at least two coils such that the primary high-pressure fill sensor 414 may determine if the second piston 1404 has passed the primary high-pressure fill sensor 414 by comparing a time difference between signal peaks of the at least two coils.

If the primary high-pressure fill sensor 414 indicates that the second piston 1404 has passed the primary high-pressure fill sensor 414, a processor in the pressure exchanger system 400 (e.g., control system 401 (FIG. 4)) may calculate a velocity of the second piston 1404 in act 1604. In some embodiments, the processor may further calculate an acceleration of the second piston 1404, such as through a third coil on the primary high-pressure fill sensor 414.

The pressure exchanger system 400 may then determine if the second piston 1404 has passed the secondary high-pressure fill sensor 416 in act 1606. The secondary high-pressure fill sensor 416 may include at least two coils such that the secondary high-pressure fill sensor 416 may determine if the second piston 1404 has passed the secondary high-pressure fill sensor 416 by comparing a time difference between signal peaks of the at least two coils.

If the secondary high-pressure fill sensor 416 indicates that the second piston 1404 has passed the secondary high-pressure fill sensor 416, a processor in the pressure exchanger system 400 may calculate a velocity of the second piston 1404 in act 1608. In some embodiments, the processor may further calculate an acceleration of the second piston 1404, such as through a third coil on the secondary high-pressure fill sensor 416.

The processor may determine if the second piston 1404 passed both the primary high-pressure fill sensor 414 and the secondary high-pressure fill sensor 416 in act 1610. For example, if the signal produced by the primary high-pressure fill sensor 414 sensor indicates that the second piston 1404 approached but did not pass through the primary high-pressure fill sensor 414 (e.g., two peaks associated with the two coils occur at substantially the same time), the processor may flag that the second piston 1404 did not pass the primary high-pressure fill sensor 414. The processor may then increase the dwell time of the clean control valve 300 such that high-pressure clean fluid continues flowing into the second chamber 1408 for a longer period after the flow out of the first chamber 1406 is stopped in act 1616. Similarly, if the second piston 1404 passes through the primary high-pressure fill sensor 414 but does not pass through the secondary high-pressure fill sensor 416 as indicated by the signals from the primary high-pressure fill sensor 414 and the secondary high-pressure fill sensor 416, the processor may increase the dwell time of the clean control valve 300 in act 1616.

In some embodiments, the dwell time may be increased by large steps if the second piston 1404 does not pass the primary high-pressure fill sensor 414 and smaller steps if the second piston 1404 passes the primary high-pressure fill sensor 414 but does not pass the secondary high-pressure fill sensor 416. In some embodiments, the size of the steps may further be defined by the magnitude of the peaks of the signal. For example, the magnitude of the peaks may correspond to the distance between the second piston 1404 and the primary high-pressure fill sensor 414 or secondary high-pressure fill sensor 416 when the second piston 1404 reversed direction. Thus, a smaller magnitude of the peaks may indicate that the second piston 1404 slowed to a stop a greater distance from the primary high-pressure fill sensor 414 or secondary high-pressure fill sensor 416, which may in turn indicate that a larger change in dwell time is necessary. In some embodiments, the setback point 410 may be modified (e.g., temporarily modified). For example, the setback point 410 may be moved toward the dirty manifold 408 to increase the likelihood of the pistons 1402, 1404 traveling a sufficient distance toward the dirty manifold 408 (e.g., past sensors 414, 416).

If the second piston 1404 passes both the primary high-pressure fill sensor 414 and the secondary high-pressure fill sensor 416, the velocities calculated in act 1604 and act 1608 may be compared to a threshold velocity in act 1612. For example, the threshold velocity at the secondary high-pressure fill sensor 416 may be between about 1 ft/s (0.3048 m/s) and about 5 ft/s (1.524 m/s), such as between about 1 ft/s (0.3048 m/s) and about 3 ft/s (0.9144 m/s). The dwell may be adjusted to cause the velocities to approach the threshold velocity in act 1614.

In some embodiments, the velocity of the second piston 1404 at the primary high-pressure fill sensor 414 may be compared to the velocity of the second piston 1404 at the secondary high-pressure fill sensor 416. For example, the velocities may indicate if the second piston 1404 is decelerating between the primary high-pressure fill sensor 414 and the secondary high-pressure fill sensor 416 indicating that the clean control valve 300 has started to close. In some embodiments, the dwell may be adjusted such that no deceleration is detected between the primary high-pressure fill sensor 414 and the secondary high-pressure fill sensor 416. In some embodiments, the dwell may be adjusted such that the deceleration between the primary high-pressure fill sensor 414 and the secondary high-pressure fill sensor 416 approaches a threshold acceleration value. In some embodiments, the dwell may be adjusted based on both the velocity of the second piston 1404 as the second piston 1404 passes through the secondary high-pressure fill sensor 416 and the deceleration of the second piston 1404 between the primary high-pressure fill sensor 414 and the secondary high-pressure fill sensor 416.

In some embodiments, the dwell may be increased through a feedback loop algorithm, such as a percent-integral-derivative (PID) loop, a step and wait algorithm, etc. In some embodiments, the dwell may be increased through a combination of control algorithms. For example, if the second piston 1404 does not pass the primary high-pressure fill sensor 414 the dwell may be increased by a large amount through an algorithm designed to provide coarse adjustments (e.g., large adjustments). If the second piston 1404 passes through both the primary high-pressure fill sensor 414 and the secondary high-pressure fill sensor 416, the dwell may be adjusted to approach the desired velocity and/or acceleration through an algorithm designed to provide fine adjustments (e.g., smaller adjustments).

As mentioned above, only one fill sensor 414 may be utilized. In such a configuration, data from the passing pistons 1402, 1404 (e.g., velocity) may be utilized to determine whether or not the pistons 1402, 1404 are likely to travel a desired distance to or toward the dirty manifold 408.

In some embodiments, the pressure exchanger system 400 may adjust algorithm parameters based on a status of the clean control valve 300. For example, the pressure exchanger system 400 may adjust thresholds between a minimum and a maximum threshold value based on a status of the clean control valve 300. If the clean control valve 300 has been instructed to close over the first chamber 1406 after the second piston 1404 passes both the primary high-pressure fill sensor 414 and the secondary high-pressure fill sensor 416, the control thresholds such as the velocity threshold and/or the acceleration threshold may be set at a minimum value such that the first piston 1402 is not held at the setback point 410 for an unnecessary amount of time.

As above, in some embodiments, the velocity or acceleration of the pistons 1402, 1404 may not be determined as the process proceeds down the left hand side of FIG. 16.

Figure 17:
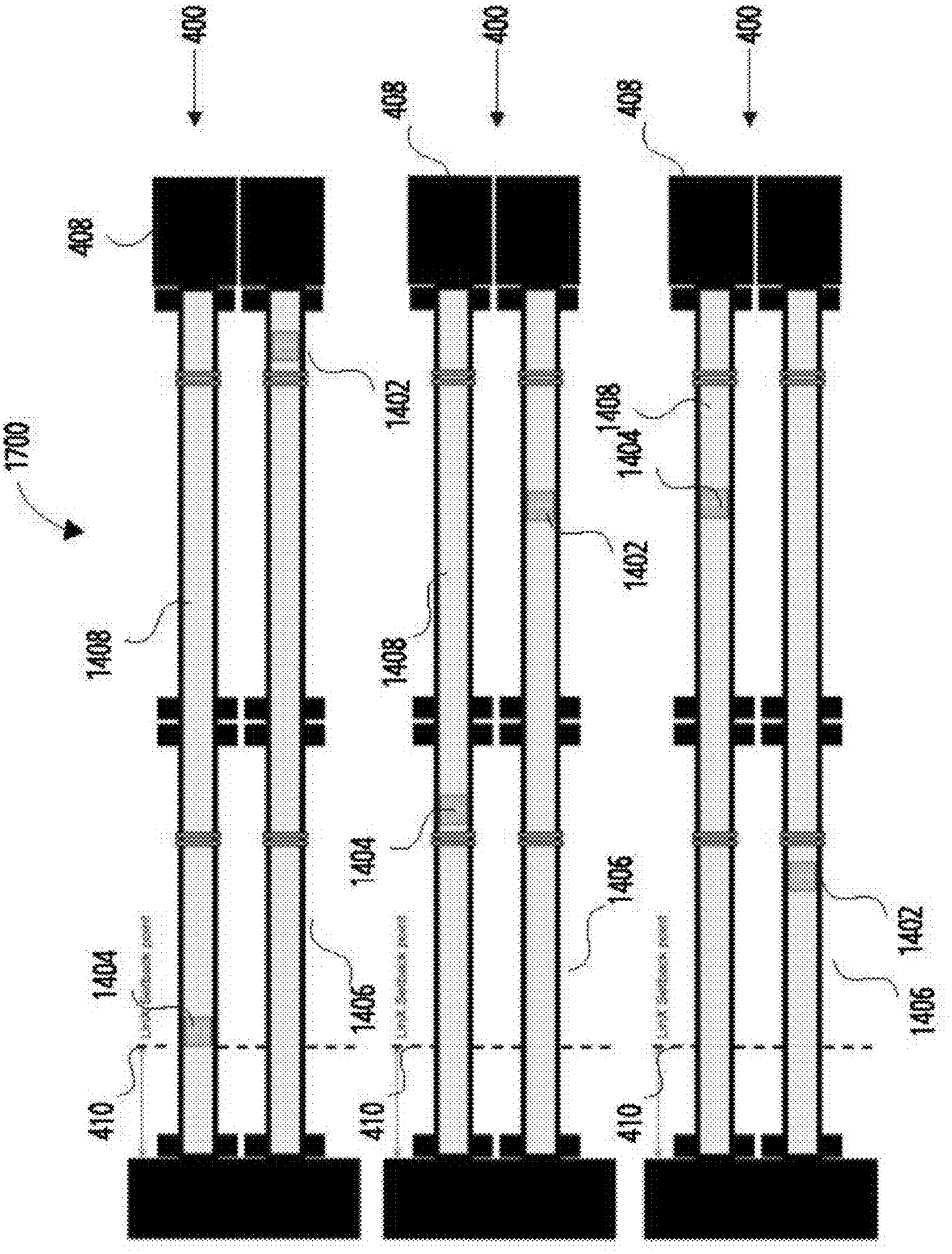
FIG. 17 is partial cross-sectional view of a fluid exchanger system according to an embodiment of the present disclosure.

FIG. 17 illustrates a system including more than one pressure exchangers, for example, a pressure exchanger stack 1700. The pressure exchanger stack 1700 may include multiple pressure exchanger systems 400. Each pressure exchanger system 400 may include a first chamber 1406 and a second chamber 1408 having the respective first piston 1402 and second piston 1404. Each pressure exchanger system 400 may be controlled such that the cycles of the first piston 1402 and the second piston 1404 of each respective pressure exchanger system 400 are equally different (e.g., offset). The differences in the cycles of the first piston 1402 and the second piston 1404 between each pressure exchanger system 400 may enable the pressure exchanger stack 1700 to produce a substantially constant pressure. For example, the dirty manifold 408 of each individual pressure exchanger system 400 may be coupled together substantially forming a single dirty manifold 408. In some embodiments, the dirty manifold 408 of each individual pressure exchanger system 400 may be coupled through piping to such that pressure of fluid output by the dirty manifolds 408 is maintained at substantially the same pressure. Thus, placing each of the pressure exchanger systems 400 in the pressure exchanger stack 1700 on different cycles may enable the pressure in the dirty manifolds 408 to collectively be substantially constant (e.g., substantially free of pulsations, water hammer, etc.).

The cycle of each of the pressure exchanger systems 400 may be defined in degrees as part of a cycle. For example, the first piston 1402 may be positioned at the setback point 410 and the second piston 1404 may be positioned at the dirty manifold 408 at 0 degrees and 360 degrees. At 180 degrees the first piston 1402 may be positioned at the dirty manifold 408 and the second piston 1404 may be positioned at the setback point 410. At 90 degrees and 270 degrees each of the first piston 1402 and the second piston 1404 may be passing a central portion of the respective first chamber 1406 and the second chamber 1408 in opposite directions.

In some embodiments, the cycles of each of the pressure exchanger systems 400 in the pressure exchanger stack 1700 may be adjusted by the 360 degrees divided by the number of pressure exchanger systems 400 in the pressure exchanger stack 1700. For example, FIG. 17 illustrates a pressure exchanger stack 1700 with three pressure exchanger systems 400. The cycle of each pressure exchanger system 400 may be 120 degrees different or offset from the adjacent pressure exchanger systems 400. In a pressure exchanger stack 1700 having four pressure exchanger systems 400, the cycles of each pressure exchanger system 400 may be 90 degrees different or offset from the adjacent pressure exchanger systems 400.

The cycles may be adjusted such that at least one chamber 1406, 1408 is in a high-pressure stroke at all times, such that a high pressure is always being provided to the dirty manifolds 408. For example, the dirty manifolds 408 may be coupled together into a single manifold and offsetting the cycles as described above may provide a substantially constant pressure in the dirty manifolds 408. As illustrated in FIG. 17, the top pressure exchanger system 400 may be at the stage of the cycle where the high- and low-pressure chambers are switching between the first chamber 1406 and the second chamber 1408 through the clean control valve 300 in the clean manifold. Thus, the top pressure exchanger system 400 may not be providing a high pressure to the dirty manifold 408. The middle pressure exchanger system 400 may be mid-stroke such that the second chamber 1408 is providing a high pressure to the dirty manifold 408. The bottom pressure exchanger system 400 may be at approaching the switching point of the cycle such that, while still providing a high pressure to the dirty manifold 408, the pressure is steadily decreasing as the clean control valve 300 begins to close.

If the cycles become synchronized (e.g., the pistons 1404, 1402 in more than one pressure exchanger system 400 are at substantially the same position in the cycle), the pressure exchanger stack 1700 may begin to experience pressure spikes or pulses. Pressure spikes may damage components in the pressure exchanger stack 1700 and/or adjoining components such as pipes, pumps, connections, couplings, manifolds, etc.

In some embodiments, the cycles of each individual the pressure exchanger system 400 may be adjusted through the dwell of the clean control valve 300. For example, if the cycle of a first pressure exchanger system 400 is too close to the cycle of an adjacent pressure exchanger system 400, the dwell of one of the first pressure exchanger system 400 and the adjacent pressure exchanger system 400 may be adjusted to hold the first piston 1402 at the setback point 410 and the second piston 1404 at the dirty manifold 408 for a time period sufficient to place the cycles of each of the first pressure exchanger system 400 and the adjacent pressure exchanger system 400 in the correct cycle spacing. In some embodiments, the dwell may be adjusted to hold the first piston 1402 at the dirty manifold 408 and the second piston 1404 at the setback point 410 until the cycles are correctly spaced. In some embodiments, the dwell may be increased by a small amount on the pressure exchanger system 400 that is out of sync such that the cycle will slowly approach the correct spacing over several cycles.

Figure 18:
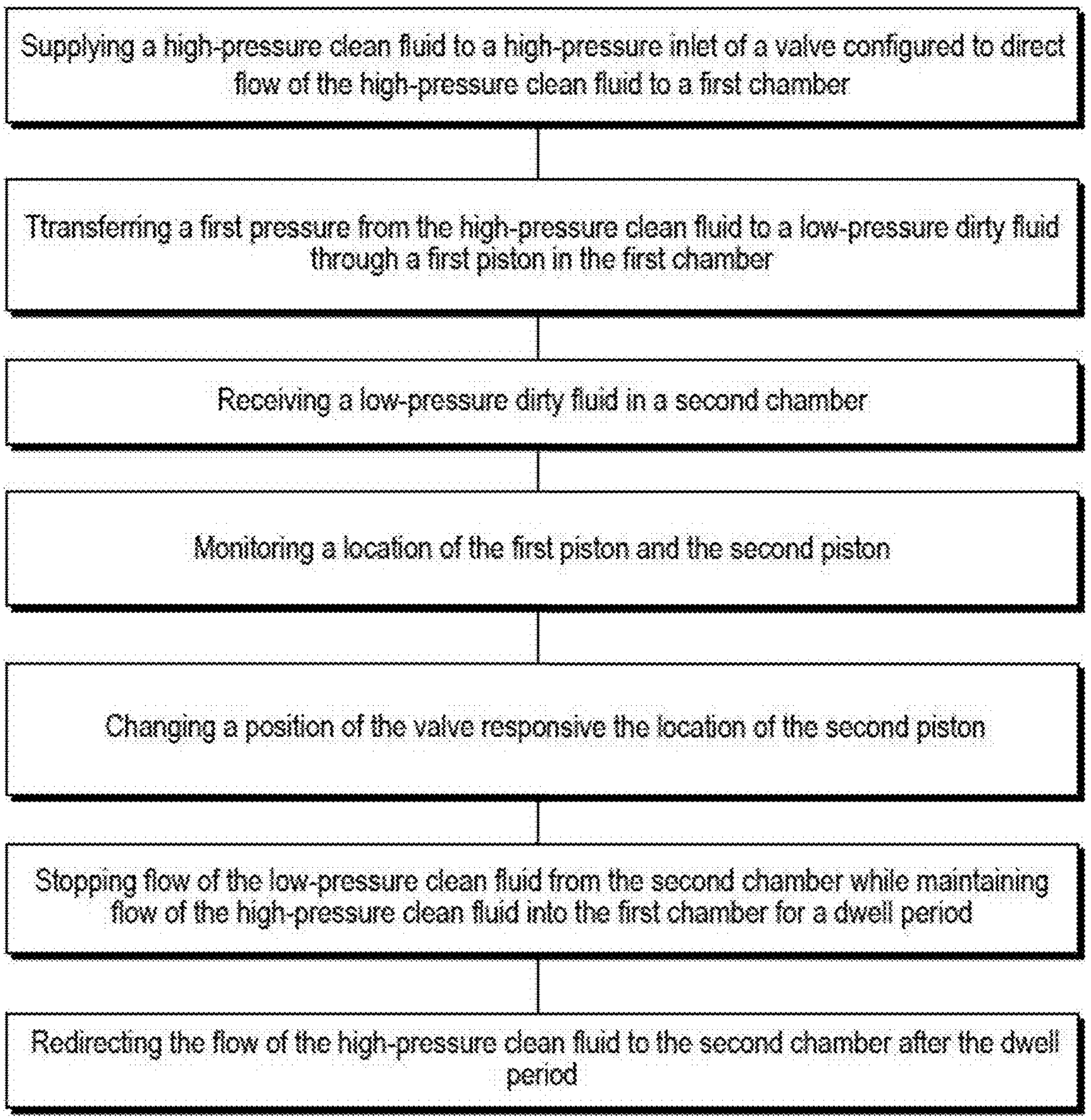
FIGS. 18 through 20 illustrate exemplary methods according to embodiments of the disclosure.
Figure 19:
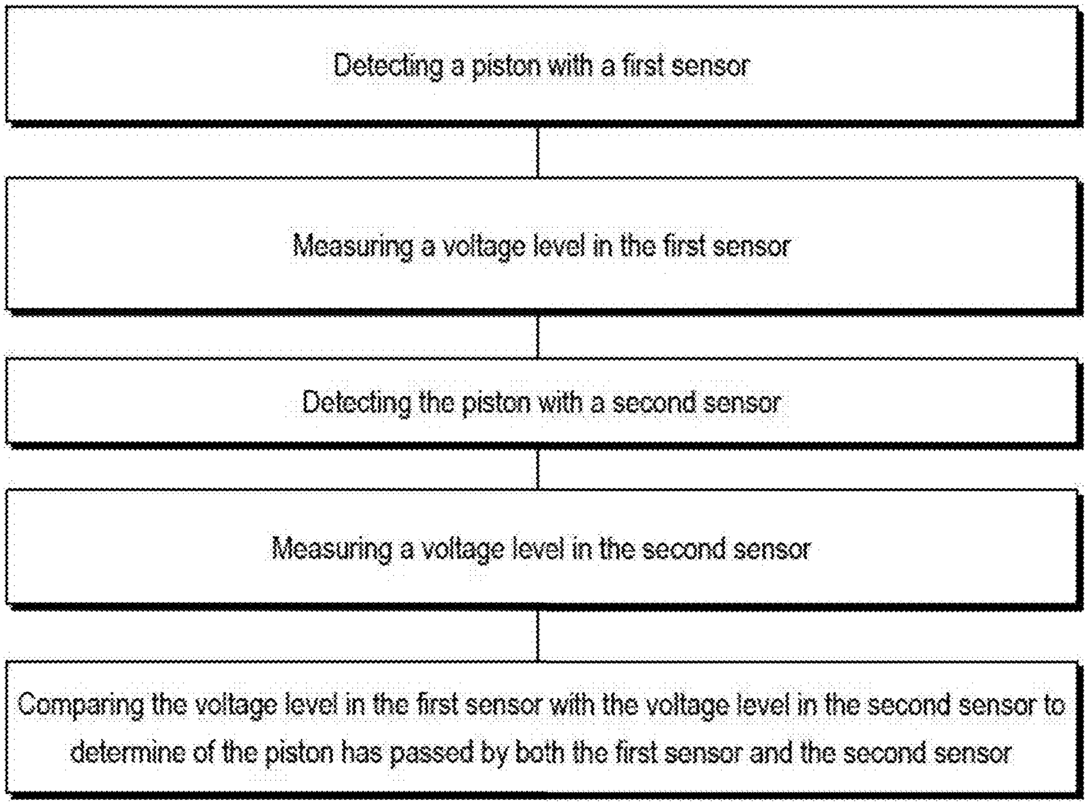
Figure 20:
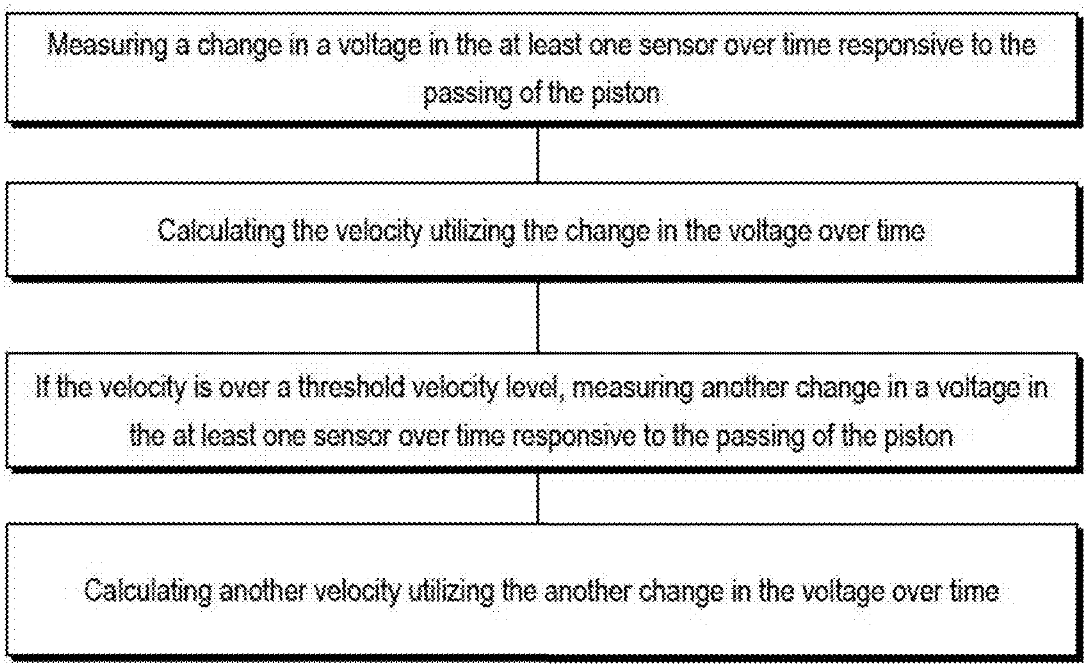

FIGS. 18 through 20 illustrate exemplary methods according to embodiments of the disclosure.

Pressure exchangers may reduce the amount of wear experienced by high-pressure pumps, turbines, and valves in systems with abrasive, caustic, or acidic fluids. The reduced wear may allow the systems to operate for longer periods with less down time resulting in increased revenue or productivity for the systems. Additionally, the repair costs may be reduced as fewer parts may wear out. In operations such as fracking operations, where abrasive fluids are used at high temperatures, repairs and downtime can result in millions of dollars of losses in a single operation. Embodiments of the present disclosure may result in a reduction in wear experienced by the components of systems where abrasive, caustic, or acidic fluids are used at high temperatures. The reduction in wear will result in cost reduction and increased revenue production.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A device for exchanging pressure between fluids, the device comprising:

at least two tanks, each tank of the at least two tanks comprising:

a first side for receiving a first fluid at a higher pressure; and a second side for receiving a second fluid at a lower pressure;

a piston independently disposed in each tank of the at least two tanks, the piston configured to travel unconstrained within the respective tank from a first axial end to a second axial end of the tank, the piston configured to separate the first fluid from the second fluid;

a control valve coupled to each of the at least two tanks at the first axial end of the respective tank, the control valve configured to selectively place the first fluid at the higher pressure in communication with the second fluid at the lower pressure through the piston in order to pressurize the second fluid to a second higher pressure in each of the at least two tanks;

at least two sensors coupled to each tank of the at least two tanks, the at least two sensors on each of the at least two tanks configured to detect a presence of the piston, a first sensor of the at least two sensors being positioned proximate the first axial end of the tank and a second sensor of the at least two sensors being positioned proximate the second axial end of the tank, the first sensor being axially spaced from the first axial end of the tank to define a first volume in which the piston is configured to travel at the first axial end of the tank between the first sensor and the first axial end, the second sensor being axially spaced from the second axial end of the tank to define a second volume in which the piston is configured to travel at the second axial end of the tank between the second sensor and the second axial end; and a controller configured to receive a signal from the at least two sensors on each of the at least two tanks, the controller configured to enable the piston to contact the second axial end while preventing the piston from contacting the first axial end.

2. The device of claim 1, wherein the tank lacks any sensors between at least one of the first sensor and the first axial end or the second sensor and the second axial end.

3. The device of claim 1, wherein the controller is further configured to:

when the second sensor detects the piston, instruct the control valve to reduce flow of the first fluid at the higher pressure at the first axial end of the tank in order to slow and stop movement of the piston in the tank as the piston approaches the second axial end; and when the first sensor detects the piston, instruct the control valve to increase flow of the first fluid at the higher pressure at the first axial end of the tank in order to slow and stop movement of the piston in the tank as the piston approaches the first axial end.

4. The device of claim 1, wherein the control valve comprises a single device coupled to each of the at least two tanks.

5. The device of claim 1, wherein the control valve is configured to change from a first position to a second position responsive the presence of the piston detected by the first sensor or the second sensor.

6. The device of claim 1, wherein each tank of the at least two tanks and the respective piston are configured to remain in communication with the second fluid at the lower pressure at the second side throughout a stroke of the piston.

7. The device of claim 1, wherein each sensor of the at least two sensors is spaced from the first axial end of the tank and the second axial end of the tank.

8. The device of claim 1, wherein the control valve is configured to only selectively place each of the at least two tanks and the respective piston in communication with the first fluid at the higher pressure at the first side of the tank.

9. The device of claim 8, wherein each of the at least two tanks are configured to remain in communication with the second fluid at the lower pressure at the second side throughout a stroke of the respective piston.

10. The device of claim 9, wherein the control valve is configured to not regulate flow of the second fluid at the lower pressure at the second side of the tank.

11. The device of claim 1, wherein at least one of the first sensor and the second sensor comprises at least two coils spaced a first distance apart along an axis of the tank.

12. A system for exchanging pressure between at least two fluid streams, the system comprising:

a pressure exchange device for exchanging at least one property between fluids, the pressure exchange device comprising:

at least two tanks, each tank of the at least two tanks comprising:

a first end for receiving a clean fluid with a first property; and a second end for receiving a dirty fluid with a second property;

at least one piston in each tank of the at least two tanks, the at least one piston configured to separate the clean fluid from the dirty fluid;

a control valve configured to selectively place the clean fluid in communication with the dirty fluid through the at least one piston in order to at least partially transfer the first property of the clean fluid to the dirty fluid, wherein each tank of the at least two tanks is coupled to and in fluid communication with the control valve at the first end of the tank; and at least one sensor positioned proximate at least one of the first end or the second end of each tank of the at least two tanks and configured to detect a position of the at least one piston as the at least one piston passes and travels beyond the at least one sensor along a length of each tank of the at least two tanks;

wherein the control valve is configured to only selectively place each tank of the at least two tanks and the at least one piston in communication with the clean fluid with the first property at the first end; and a controller configured to receive a signal from the at least one sensor on each of the at least two tanks, the controller configured to prevent the at least one piston from contacting the first end of each tank of the at least two tanks at the control valve and further configured to enable the at least one piston to contact the second end of each tank of the at least two tanks.

13. The system of claim 12, wherein the at least one sensor comprises at least two sensors configured to detect a presence of the at least one piston, wherein the at least two sensors comprise a first sensor is located near, but spaced from, the first end of each tank of the at least two tanks and a second sensor is located near, but spaced from, the second end of each tank of the at least two tanks.

14. The system of claim 13, wherein the at least two sensors are configured to each transmit a signal to the control valve responsive the position of the at least one piston and the control valve is configured to change from a first position to a second position responsive the signal from the first sensor and change from the second position to the first position responsive the signal from the second sensor.

15. The system of claim 14, wherein the first sensor is located a distance from the first end of each tank of the at least two tanks, and wherein the distance is sufficient for the at least one piston to change directions responsive to the control valve changing from the first position to the second position before reaching the first end of the tank.

16. A method of controlling a pressure exchange device comprising:

supplying a high pressure fluid to a high pressure inlet of a valve configured to direct flow of the high pressure fluid to a chamber;

transferring a pressure from the high pressure fluid to a lower pressure fluid through a piston in the chamber;

monitoring a location of the piston with at least one sensor positioned proximate an axial end of the chamber as the piston passes and travels beyond the at least one sensor along an axial length of the chamber traveling in a direction toward the axial end;

when the at least one sensor detects the piston, changing a position of the valve responsive the location of the piston and reducing flow of the high pressure fluid to the chamber in order to slow and stop movement of the piston in the chamber before the piston reaches the axial end;

while changing the position of the valve, maintaining fluid communication of the lower pressure fluid with the chamber proximate a second axial end of the chamber;

redirecting the flow of the high pressure fluid; and forcing the piston into contact with the second axial end of the chamber with the high pressure fluid.

17. The method of claim 16, wherein monitoring the location of the piston comprises sensing of a position of the piston within the chamber with the at least one sensor comprising at least two coils spaced a distance apart along an axis of the chamber.

18. The method of claim 16, wherein monitoring the location of the piston comprises sensing of a position of the piston within the chamber with the at least two sensors poisoned at the axial end and the second axial end of the chamber.

19. The method of claim 18, further comprising preventing the piston from contacting the axial end of the chamber with the high pressure fluid.

* * * * *